(12) United States Patent
Hurry

(10) Patent No.: US 9,349,127 B2
(45) Date of Patent: May 24, 2016

(54) SERIAL NUMBER AND PAYMENT DATA BASED PAYMENT CARD PROCESSING

(75) Inventor: Simon J. Hurry, Foster City, CA (US)

(73) Assignee: Visa USA Inc., San Francisco, CA (US)

(*) Notice: Subject to any disclaimer, the term of this patent is extended or adjusted under 35 U.S.C. 154(b) by 147 days.

(21) Appl. No.: 12/129,470

(22) Filed: May 29, 2008

(65) Prior Publication Data

US 2009/0144205 A1 Jun. 4, 2009

Related U.S. Application Data

(60) Provisional application No. 60/991,146, filed on Nov. 29, 2007, provisional application No. 61/012,378, filed on Dec. 7, 2007.

(51) Int. Cl.
| | |
|---|---|
| *G06Q 20/00* | (2012.01) |
| *G06Q 20/40* | (2012.01) |
| *G06Q 20/08* | (2012.01) |
| *G06Q 20/12* | (2012.01) |

(Continued)

(52) U.S. Cl.
CPC .......... *G06Q 20/4037* (2013.01); *G06Q 20/085* (2013.01); *G06Q 20/12* (2013.01); *G06Q 20/14* (2013.01); *G06Q 20/367* (2013.01); *G06Q 20/3674* (2013.01); *G06Q 20/382* (2013.01); *G06Q 20/3829* (2013.01); *G06Q 20/40* (2013.01); *G06Q 20/401* (2013.01); *G06Q 20/4012* (2013.01); *G06Q 30/0601* (2013.01); *G07F 7/08* (2013.01); *H04N 21/2542* (2013.01); *H04N 21/2543* (2013.01); *H04N 21/4182* (2013.01); *H04N 21/42684* (2013.01); *H04N 21/47815* (2013.01)

(58) Field of Classification Search
USPC .......................................................... 705/75
See application file for complete search history.

(56) References Cited

U.S. PATENT DOCUMENTS

| | | | |
|---|---|---|---|
| 5,398,285 | A | 3/1995 | Borgelt et al. |
| 5,592,212 | A | 1/1997 | Handelman |

(Continued)

FOREIGN PATENT DOCUMENTS

| | | |
|---|---|---|
| JP | 2002-183442 A | 6/2002 |
| KR | 10-2003-0094710 | 12/2003 |

(Continued)

OTHER PUBLICATIONS

Friedl, S., "An Illustrated Guide to IPSec", Available from http://unixwiz/techtips/iguide-ipsec.html, 2005, 17 pages.

(Continued)

*Primary Examiner* — Zeshan Qayyum
(74) *Attorney, Agent, or Firm* — Kilpatrick Townsend & Stockton LLP

(57) ABSTRACT

A server is operable to receive a media device identifying number (ID) and establish an association between a media device and a payment account and, in one embodiment, supports at least one of payment authorization and payment clearing based at least in part on the media device ID and the payment account. A network and system includes a payment card processor server that is operable to receive a payment authorization request and to determine if an authorized media device generated a purchase selection message and to determine to approve a received payment authorization request based, in part, if the media device was authorized for the purchase selection based upon a received media device ID.

18 Claims, 20 Drawing Sheets

(51) Int. Cl.

| | | |
|---|---|---|
| *G06Q 20/14* | (2012.01) | |
| *G06Q 20/36* | (2012.01) | |
| *G06Q 20/38* | (2012.01) | |
| *G06Q 30/06* | (2012.01) | |
| *G07F 7/08* | (2006.01) | |
| *H04N 21/254* | (2011.01) | |
| *H04N 21/2543* | (2011.01) | |
| *H04N 21/418* | (2011.01) | |
| *H04N 21/426* | (2011.01) | |
| *H04N 21/478* | (2011.01) | |

(56) References Cited

U.S. PATENT DOCUMENTS

| | | | |
|---|---|---|---|
| 5,592,611 A | | 1/1997 | Midgely et al. |
| 5,745,576 A | | 4/1998 | Abraham et al. |
| 5,794,207 A | | 8/1998 | Walker et al. |
| 5,825,884 A | | 10/1998 | Zdepski et al. |
| 5,892,900 A | | 4/1999 | Ginter et al. |
| 5,915,093 A | | 6/1999 | Berlin et al. |
| 6,014,636 A | | 1/2000 | Reeder |
| 6,085,168 A | * | 7/2000 | Mori et al. ............. 705/17 |
| 6,098,879 A | * | 8/2000 | Terranova ............. 235/384 |
| 6,105,008 A | | 8/2000 | Davis et al. |
| 6,142,369 A | * | 11/2000 | Jonstromer ......... G06Q 20/105 235/379 |
| 6,219,692 B1 | | 4/2001 | Stiles |
| 6,223,209 B1 | | 4/2001 | Watson |
| 6,298,373 B1 | | 10/2001 | Burns |
| 6,327,578 B1 | * | 12/2001 | Linehan ............. 705/65 |
| 6,367,011 B1 | | 4/2002 | Lee et al. |
| 6,370,580 B2 | | 4/2002 | Kriegsman |
| 6,618,858 B1 | | 9/2003 | Gautier |
| 6,779,115 B1 | | 8/2004 | Naim |
| 6,789,198 B1 | | 9/2004 | Chan |
| 7,107,248 B1 | | 9/2006 | Asokan et al. |
| 7,155,411 B1 | | 12/2006 | Blinn et al. |
| 7,239,706 B1 | | 7/2007 | Wilhelm et al. |
| 7,249,097 B2 | | 7/2007 | Hutchison et al. |
| 7,349,871 B2 | * | 3/2008 | Labrou et al. ............. 705/26.35 |
| 7,404,202 B2 | | 7/2008 | Hamilton et al. |
| 7,512,567 B2 | | 3/2009 | Bemmel et al. |
| 7,571,139 B1 | * | 8/2009 | Giordano et al. ............. 705/40 |
| 7,578,439 B2 | | 8/2009 | Graves et al. |
| 7,606,560 B2 | | 10/2009 | Labrou et al. |
| 7,607,583 B2 | | 10/2009 | Berardi et al. |
| 7,707,412 B2 | | 4/2010 | Nyberg et al. |
| 7,849,307 B2 | | 12/2010 | Roskind |
| 7,983,994 B2 | | 7/2011 | Hurry |
| 8,396,799 B2 | | 3/2013 | Hurry |
| 2001/0016833 A1 | * | 8/2001 | Everling ............. G06Q 20/10 705/39 |
| 2002/0034304 A1 | * | 3/2002 | Yang ............. 380/281 |
| 2002/0065743 A1 | | 5/2002 | Bates et al. |
| 2002/0065774 A1 | * | 5/2002 | Young ............. G06Q 20/02 705/41 |
| 2002/0107016 A1 | | 8/2002 | Hanley |
| 2003/0066091 A1 | | 4/2003 | Lord et al. |
| 2003/0097571 A1 | | 5/2003 | Hamilton et al. |
| 2003/0145205 A1 | | 7/2003 | Sarcanin |
| 2004/0024702 A1 | | 2/2004 | Angel et al. |
| 2004/0039648 A1 | | 2/2004 | Candelore et al. |
| 2004/0088558 A1 | | 5/2004 | Candelore et al. |
| 2004/0122685 A1 | | 6/2004 | Bunce |
| 2004/0193553 A1 | | 9/2004 | Lloyd et al. |
| 2004/0195316 A1 | | 10/2004 | Graves et al. |
| 2004/0230488 A1 | * | 11/2004 | Beenau ............. G06K 9/00 705/18 |
| 2005/0013437 A1 | | 1/2005 | Ikonen et al. |
| 2005/0027543 A1 | | 2/2005 | Labrou et al. |
| 2005/0051619 A1 | | 3/2005 | Graves et al. |
| 2005/0138429 A1 | | 6/2005 | Miura |
| 2005/0209975 A1 | | 9/2005 | So et al. |
| 2005/0210251 A1 | | 9/2005 | Nyberg et al. |
| 2005/0268107 A1 | | 12/2005 | Harris et al. |
| 2006/0089843 A1 | | 4/2006 | Flather |
| 2006/0122945 A1 | | 6/2006 | Ripberger et al. |
| 2006/0153387 A1 | | 7/2006 | Lee et al. |
| 2006/0178988 A1 | | 8/2006 | Egendorf |
| 2006/0206709 A1 | | 9/2006 | Labrou et al. |
| 2006/0224513 A1 | | 10/2006 | Kawamoto et al. |
| 2006/0249576 A1 | | 11/2006 | Nakada et al. |
| 2007/0107016 A1 | | 5/2007 | Angel et al. |
| 2007/0107017 A1 | | 5/2007 | Angel et al. |
| 2007/0118887 A1 | | 5/2007 | Roskind |
| 2007/0138261 A1 | | 6/2007 | Flinchem |
| 2007/0187492 A1 | | 8/2007 | Graves et al. |
| 2007/0192207 A1 | | 8/2007 | Poltorak |
| 2007/0276765 A1 | | 11/2007 | Hazel et al. |
| 2007/0288394 A1 | | 12/2007 | Carrott |
| 2008/0010193 A1 | | 1/2008 | Rackley, III et al. |
| 2008/0016001 A1 | | 1/2008 | Nakano et al. |
| 2008/0052180 A1 | | 2/2008 | Lawhorn |
| 2008/0052183 A1 | | 2/2008 | Hobson et al. |
| 2008/0077956 A1 | | 3/2008 | Morrison et al. |
| 2008/0168270 A1 | * | 7/2008 | Kulakowski et al. ......... 713/168 |
| 2008/0203172 A1 | | 8/2008 | Berardi et al. |
| 2008/0273704 A1 | | 11/2008 | Norrman et al. |
| 2008/0281718 A1 | | 11/2008 | Morgan |
| 2009/0138366 A1 | | 5/2009 | Bemmel et al. |
| 2009/0144197 A1 | | 6/2009 | Hurry |
| 2009/0144202 A1 | | 6/2009 | Hurry |
| 2009/0144203 A1 | | 6/2009 | Hurry |
| 2009/0144204 A1 | | 6/2009 | Hurry |
| 2009/0260064 A1 | | 10/2009 | McDowell et al. |
| 2011/0238578 A1 | | 9/2011 | Hurry |
| 2013/0226814 A1 | | 8/2013 | Hurry |
| 2014/0180930 A1 | | 6/2014 | Hurry |

FOREIGN PATENT DOCUMENTS

| | | |
|---|---|---|
| KR | 10-2004-0084505 A | 10/2004 |
| KR | 10-2006-0104147 A | 10/2006 |
| WO | 00/49551 | 8/2000 |
| WO | WO 2009/148865 A2 | 12/2009 |

OTHER PUBLICATIONS

Fulong, Julia, "UNC's Dance Marathon compares favorable with others", The Daily Tar Heel, Feb. 28, 2005, 3 pages.

Hafner, Katie, "Will that be Cash or Cell Phone?; Wireless Payment Systems Might Mean Dialing [Into] Your Own Wallet", The New York Times, Mar. 2, 2000, 4 pages.

Juniper Networks, Inc., IPSec, Retrieved from Internet Archive Wayback Machine, available from <http://web.archive.org/wev/20030912201348/http://www.juniper.net/techpubs/software/erx/erx50x/erx-product-overview/html/routing-protocols-overview4.html>, Archived Sep. 12, 2003, 4 pages.

Mangalindan, M., et al., "You've Got Money: Paying via Text Message", The Wall Street Journal, Apr. 26, 2006, 4 pages.

Wired Magazine, "U.S. Plays Dumb with Smart Cards", Aug. 22, 2001, 2 pages, available from the internet at http://www.wired.com/techbiz/media/news/2001/08/46242.

International Search Report and Written Opinion mailed on Dec. 31, 2009 for Patent Application No. PCT/US2009/045066, 12 pages.

Office Action of Mar. 5, 2010 for U.S. Appl. No. 12/247,227, 19 pages.

Office Action of Dec. 28, 2009 for U.S. Appl. No. 12/247,225, 17 pages.

Office Action of Apr. 22, 2010 for U.S. Appl. No. 12/247,225, 5 pages.

Office Action for U.S. Appl. No. 12/129,396 of Jul. 7, 2010, 19 pages.

Office Action, Interview Summary of Jun. 7, 2010 for U.S. Appl. No. 12/247,227, 4 pages.

Derfler, F., et al., How Networks Work, Millennium Edition, Que Publishing, 2000, 9 pages.

Inside Windows Product Activation, Fully Licensed GmbH, Jul. 2001, 11 pages; Available from<http://www.licenturion.com/xp/fully-licensed-wpa.txt>.

(56) References Cited

OTHER PUBLICATIONS

McKenna Findlay, Andrea., "In store deployments of Web-based kiosks are bringing in clicks closed to the bricks", Internet Retailer Magazine, Apr. 2001, 3 pages.
Microsoft, How to Activate Windows XP, Microsoft Corporation. Stored in Internet Archive Wayback Machine, Oct. 28, 2004, 1 page.
Padilla, L., "Track format of magnetic stripe card", Last updated Dec. 12, 200. Located at http://www.gae.ucm.es/~padilla/extrawork/tracks.html.
Sloman, M., ed., Network and Distributed Systems Management, Addison-Wesley Publishing Co., Wokingham, England, 1994, 27 pages.
Rankl, W., et al., Smart Card Handbook, 2nd Edition, Wiley, New York, 2000, 123 pages.
Office Action of Dec. 16, 2010 for U.S. Appl. No. 12/129,396; 12 pages.
Office Action of Nov. 26, 2010 for U.S. Appl. No. 12/247,225; 20 pages.
Office Action of Nov. 15, 2010 for U.S. Appl. No. 12/247,227; 25 pages.
Office Action of Oct. 27, 2010 for U.S. Appl. No. 12/247,223; 6 pages.
Restriction Requirement of Aug. 4, 2011 for U.S. Appl. No. 12/247,223, 7 pages.
Non-Final Office Action of Jul. 22, 2011 for U.S. Appl. No. 12/129,396, 12 pages.
Advisory Action of Feb. 16, 2011 for U.S. Appl. No. 12/129,396; 5 pages.
Notice of Allowance of Mar. 16, 2011 for U.S. Appl. No. 12/247,225; 14 pages.
Non-Final Office Action of Feb. 3, 2011 for U.S. Appl. No. 12/247,223; 26 pages.
Applicant-Initiated Interview Summary of Feb. 13, 2012 for U.S. Appl. No. 12/129,396, 3 pages.
Advisory Action of Feb. 1, 2012 for U.S. Appl. No. 12/247,223; 3 pages.
Non-Final Office Action of Jan. 5, 2012 for U.S. Appl. No. 12/129,396; 13 pages.
Office Action for Australian Patent Application No. 2010202061 mailed Oct. 1, 2014, 4 pages.
Non-Final Office Action for U.S. Appl. No. 12/247,227 mailed on Oct. 15, 2014, 13 pages.
Non-Final Office Action for U.S. Appl. No. 12/247,223 mailed on Nov. 14, 2014, 16 pages.
Office Action for Australian Patent Application No. 2010202066 mailed May 30, 2014, 4 pages.
Office Action for Australian Patent Application No. 2010202038 mailed Jun. 4, 2014, 7 pages.
Interview Summary for U.S. Appl. No. 12/247,225 mailed on Apr. 22, 2010, 4 pages.
Non-Final Office Action for U.S. Appl. No. 12/129,396 mailed on Jul. 7, 2010, 18 pages.
Restriction Requirement for U.S. Appl. No. 12/247,223 mailed on Oct. 27, 2010, 6 pages.
Non-Final Office Action for U.S. Appl. No. 12/129,396 mailed on May 10, 2012, 11 pages.
Restriction Requirement for U.S. Appl. No. 13/157,129 mailed on May 29, 2012, 6 pages.
Non-Final Office Action for U.S. Appl. No. 13/157,129 mailed on Aug. 8, 2012, 11 pages.
Notice of Allowance for U.S. Appl. No. 12/129,396 mailed on Nov. 9, 2012, 8 pages.
Non-Final Office Action for U.S. Appl. No. 13/157,129 mailed on Jan. 2, 2013, 8 pages.
Final Office Action for U.S. Appl. No. 13/157,129 mailed on Jun. 28, 2013, 10 pages.
Notice of Allowance for U.S. Appl. No. 13/764,183 mailed on Aug. 20, 2013, 9 pages.
Applicant-Initiated Interview Summaries for U.S. Appl. No. 13/157,129 mailed on Oct. 2, 2013, 6 pages.
Non-Final Office Action for U.S. Appl. No. 14/085,750 mailed on Dec. 17, 2014, 16 pages.
Final Office Action for U.S. Appl. No. 12/247,227 mailed on Apr. 17, 2015, 10 pages.
Final Office Action for U.S. Appl. No. 12/247,223 mailed on Jun. 16, 2015, 18 pages.
Office Action for Australian Patent Application No. 2010202038 mailed Jul. 3, 2015, 3 pages.
Final Office Action of Nov. 9, 2011 for U.S. Appl. No. 12/247,223, 22 pages.
Interview Summary of Aug. 4, 2010 for U.S. Appl. No. 12/247,225, 8 pages.

* cited by examiner prior art transaction authorization system 10 system 80

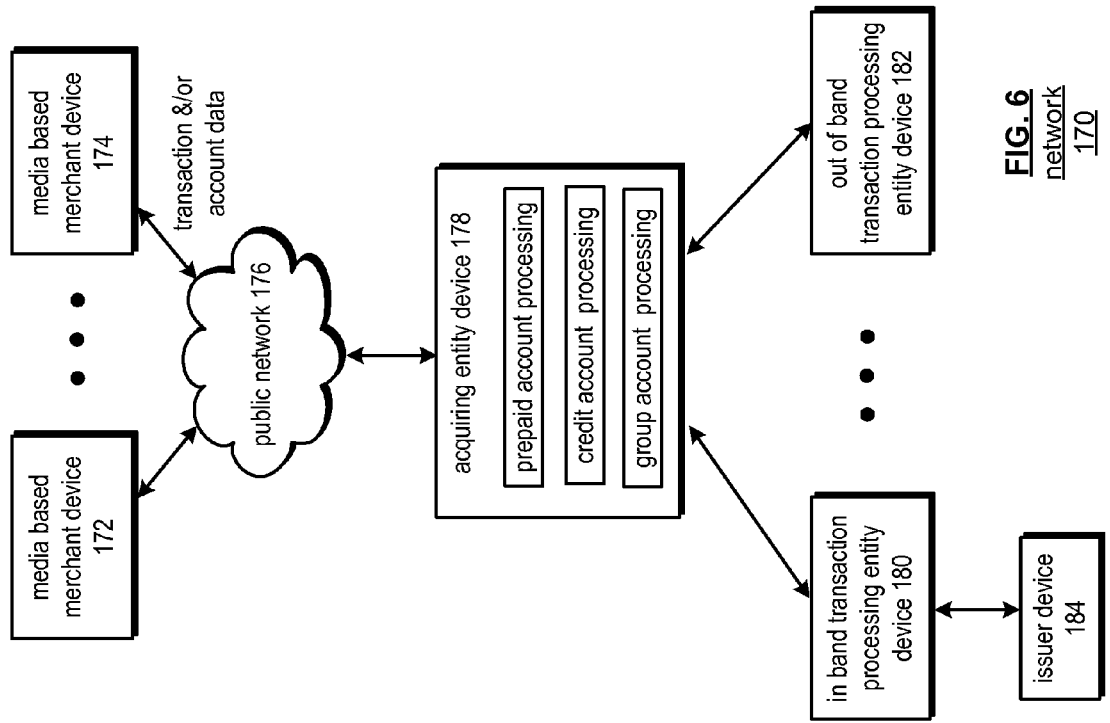
FIG. 6
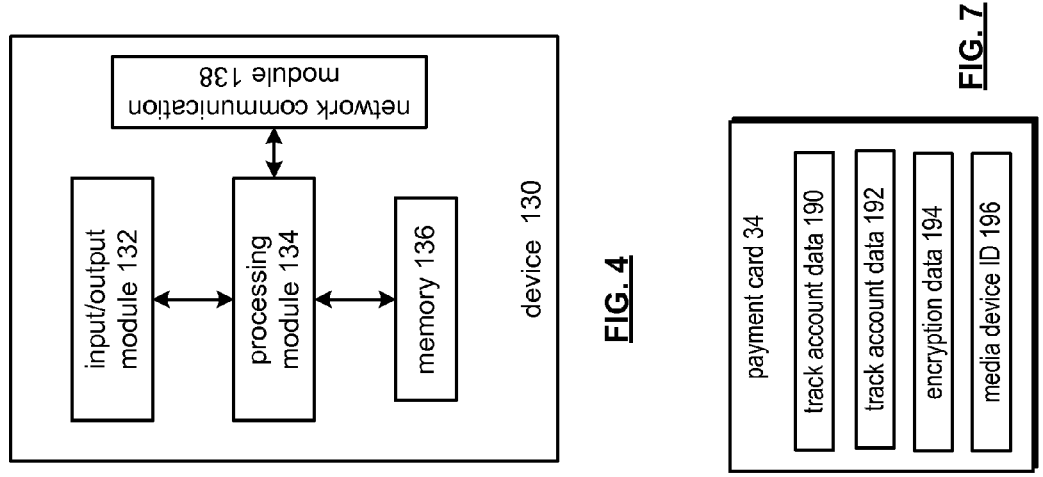
FIG. 4
FIG. 7 network 140

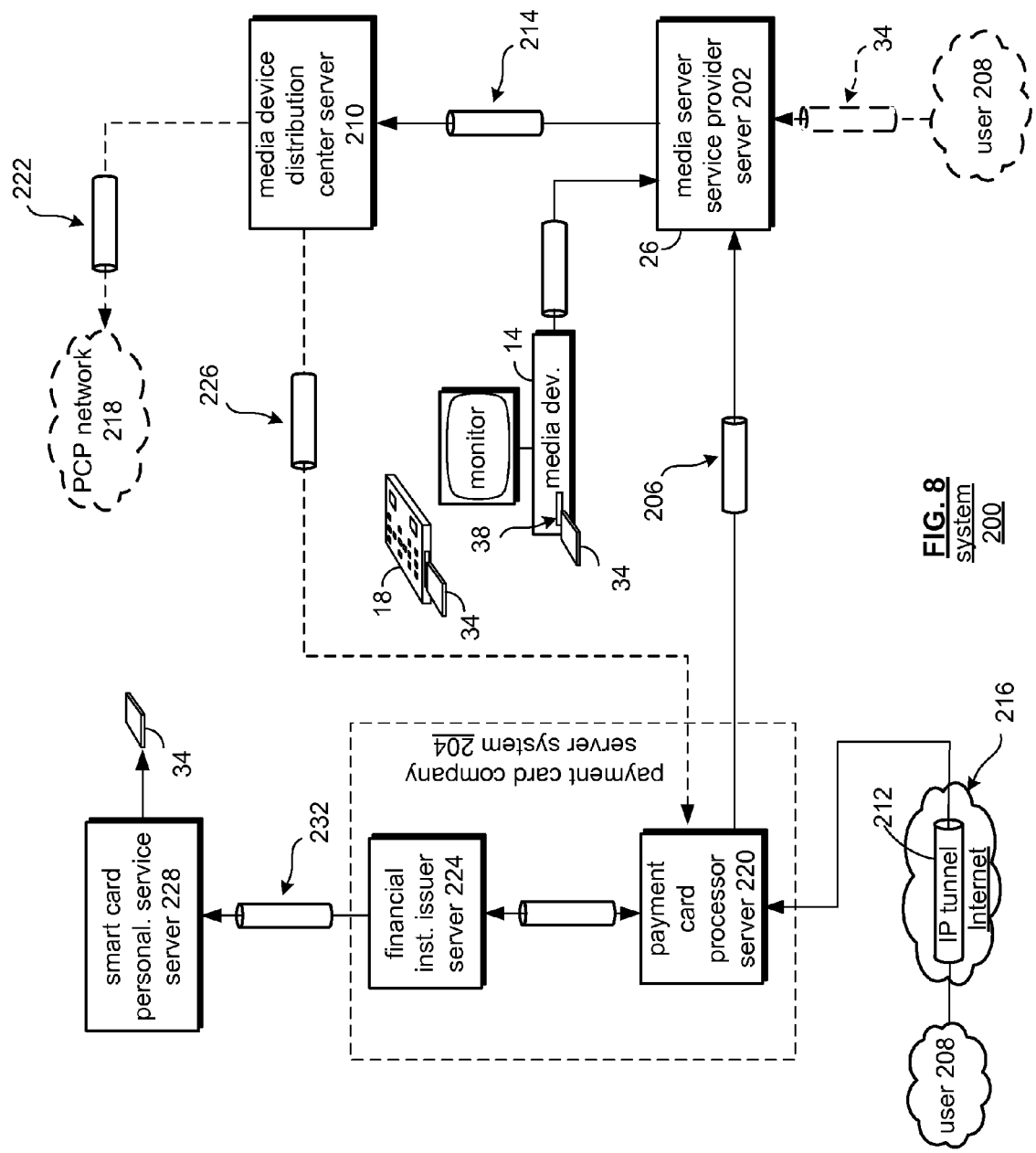

system 250 system 310 system 350 system 600

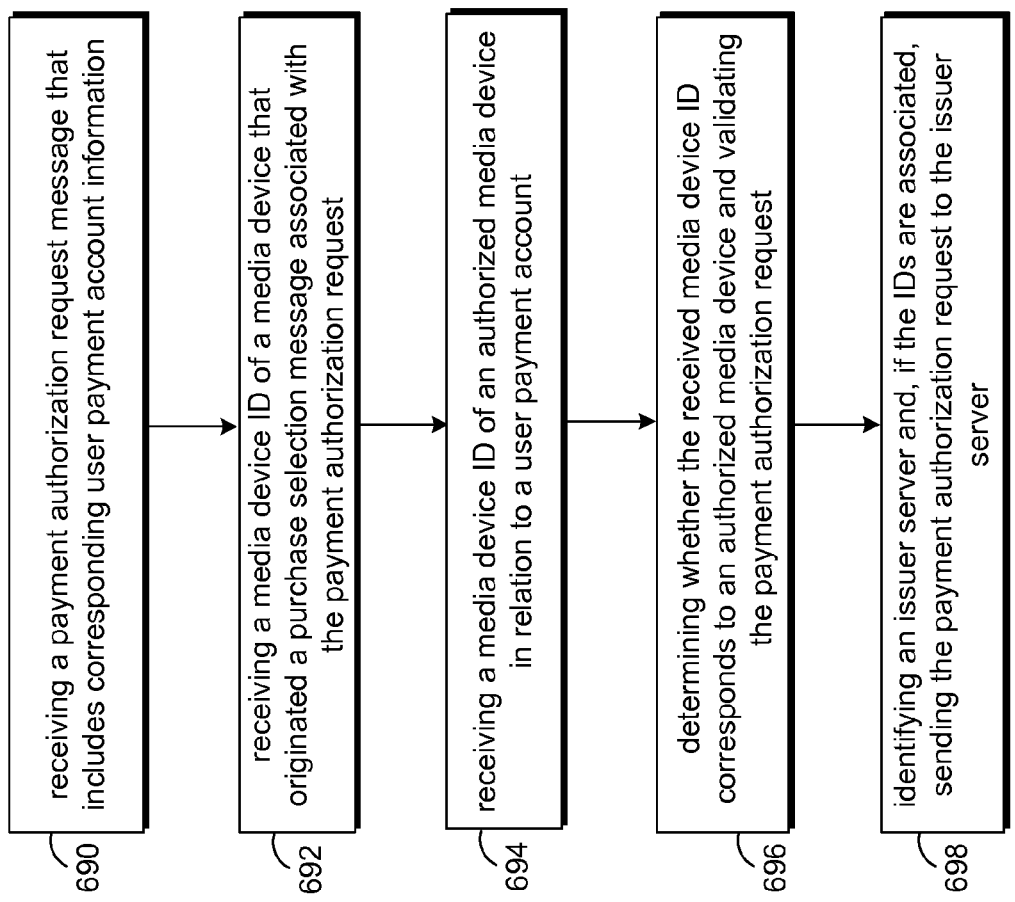

SERIAL NUMBER AND PAYMENT DATA BASED PAYMENT CARD PROCESSING

CROSS-REFERENCE TO RELATED PATENTS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:
1. U.S. Provisional Application Ser. No. 60/991,146, entitled "IPMD Payments Remote Control Personalization," filed Nov. 29, 2007, pending.
2. U.S. Provisional Application Ser. No. 61/012,378, entitled "IPMD Payments Remote Control Personalization and Protection," filed Dec. 7, 2007.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

The present invention relates to systems, devices and method that facilitate electronic commerce transactions.

2. Description of Related Art

Consumers, product and service merchants, purchasing and sales agents, suppliers, manufacturers, credit card and debit card companies and banks have all seen process improvements including improved payment processes due to advances in electronic commerce technology. Buyers can now find desired products through Internet searches and can purchase goods and services through secure online channels. Transactions may be processed almost instantly leading to faster delivery of the purchased item, media content, or service.

One aspect of such transactions is the common concern of theft of payment account information. Accordingly, e-commerce systems typically include, when the user chooses to make a purchase, the establishment of an encrypted tunnel between the merchant and the customer so that payment account information may be transmitted safely. Typically, a secure page is provided to the customer to prompt the customer to enter a payment account number and other required account information. A merchant server then validates the account information as a part of completing the transaction. Thereafter, a purchase confirmation is generated in one of a variety of formats to the customer.

In addition to the advances in e-commerce, the Internet is also changing the way that television is being watched. As Internet storage capacity and throughput have increased, and user terminal memory and data processing technology has advanced, media servers now deliver streaming video at a data rate that provides resolution and quality comparable to broadcast/cable/satellite television. Media servers now transmit streaming video having content similar to that provided by prior television services.

Along similar lines, Internet Protocol television boxes have been developed that support the display of streamed media and other data received over the Internet on a television. Accordingly, the manner in which television and other media content are delivered may undergo a dramatic change and may even result in a decoupling of program scheduling and viewer enjoyment. Moreover, the interactive nature of personal computers and other Internet Protocol based systems may allow for more interaction between a user and the media and advertisements viewed on a display device.

As is known, advertisements displayed on a computer terminal include tags that are used to track user interest and to give credit to a particular web page provider for generating a positive response to the advertisement. While television advertisements are unidirectional broadcasts and provide no direct feedback that allows a merchant or television broadcaster to determine consumer interest, Internet based advertisements are interactive as associated scripts are operable to indicate whether a user selected an advertisement for closer review and even whether the user purchased a product in response to the advertisement using the e-commerce transaction technology mentioned before. E-commerce and its payment processes, however, are currently setup to only support transactions that result from shopping activities in a physical or virtual store that often result from the uni-directional broadcast advertisements and web-based product and service searches.

FIG. 1 is a functional diagram that illustrates a payment card authorization process that can support a typical e-commerce transaction according to the prior art. As may be seen, a cardholder initially presents a payment card to a merchant. Specifically, the card is presented to a point of sale terminal or, as described previously, the account information is presented to the terminal through secured data entry over the Internet. Thereafter, the merchant produces card and payment information to an acquirer server. An acquirer is a payment card association member that initiates and maintains relationships with merchants that accept payment cards. Thereafter, the acquirer server produces an authorization request to a payment card company for review. The payment card company then sends the authorization request for review to the appropriate payment card issuer. The payment card issuer then issues an approval or denial that is propagated back to the merchant.

BRIEF DESCRIPTION OF THE SEVERAL VIEWS OF THE DRAWINGS

FIG. 4 is a functional block diagram of a payment card company server that is operable to receive and process an application for a payment account that is to be associated with a media device according to one embodiment of the invention.

FIG. 6 is a functional block diagram of a computer network operable to support payment authorization processing according to one embodiment of the invention.

FIG. 7 is a functional block diagram of a payment account according to one embodiment of the invention.

FIG. 8 is a functional block diagram of a computer system that illustrates a process for creating an established association between a payment account and a media device according to one embodiment of the invention.

FIGS. 19-20 are flow charts that illustrate method steps for approving a payment authorization request according to a plurality of embodiment of the invention.

DETAILED DESCRIPTION OF THE INVENTION

Figure 2:
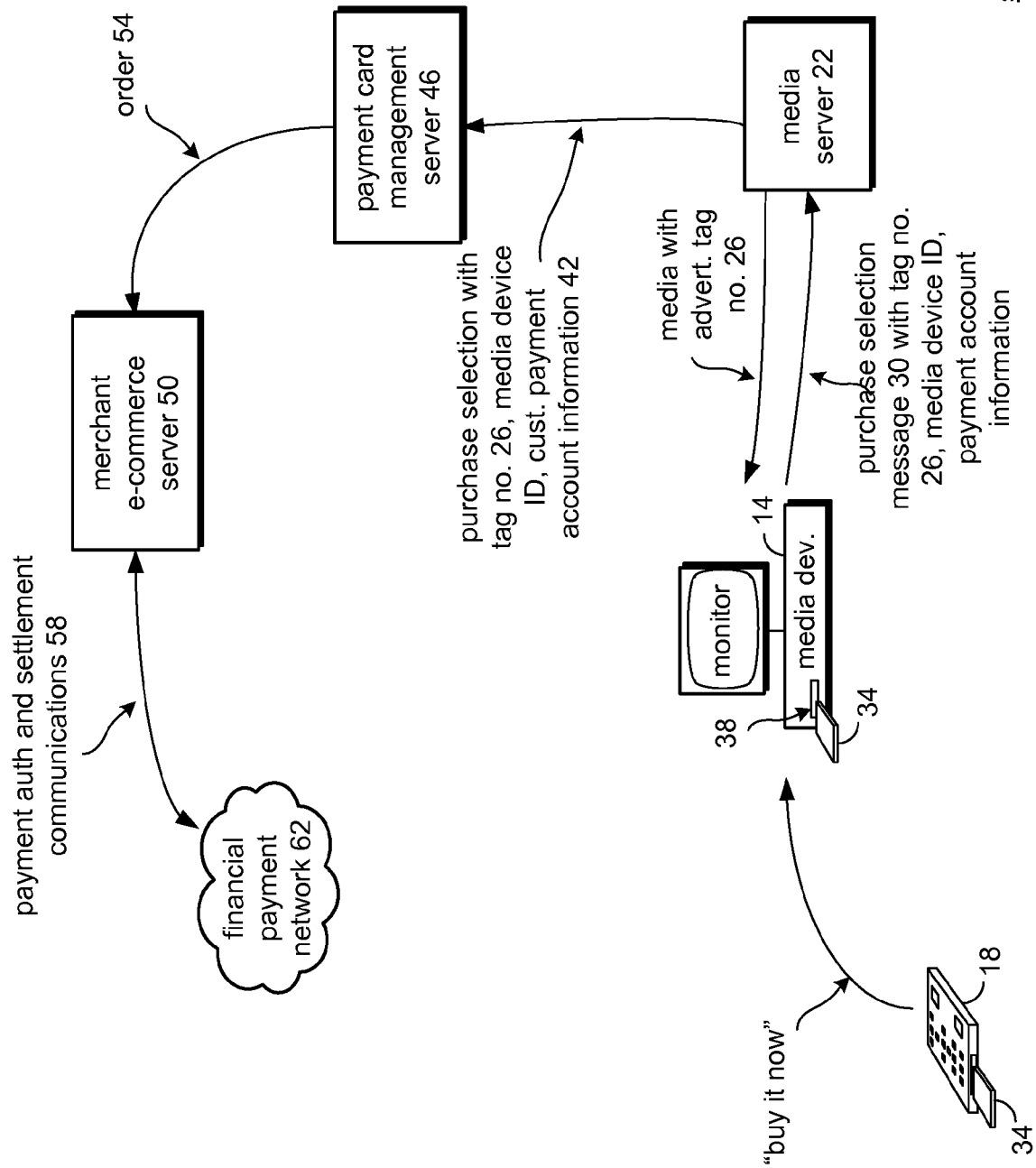
FIG. 2 is a functional block diagram of a system 10 that illustrates a process flow for a system to implement a "buy it now" feature according to one embodiment of the invention.

FIG. 2 is a functional block diagram of a system 10 that illustrates one embodiment of a process flow for a system to implement a "buy it now" feature. The "buy it now" feature supported by the systems, networks, devices and methods of the various embodiments of the invention allow a user to initiate a purchase of an advertised item by interaction with a media device that has an established association with a payment account without requiring the user to manually enter necessary payment account information. Merely pressing the "buy it now" button triggers an authorization and subsequent settlement process based upon stored payment account information that is associated with the media device. The media device may be a cable television set top box, a satellite television set top box, an IP television (IPTV) set top box, a personal or laptop computer, or an IP game box capable playing interactive games over the Internet. Any device such as an IPTV set top box, IP game box or other device operable to receive media over the Internet is included in references to IP media devices (IPMDs, media devices).

To achieve this functionality, devices, systems, networks, and/or associated method steps generally support a process to generate a payment account that has an established association with a specific media device. References herein to a media device are references to any type of device that can communicate over an IP network, a public network including the Internet, cable TV, satellite TV networks, and other types of networks that support data communications. The payment accounts may be card based in the form of a plastic bank card, a smart card, a dedicated SIM card, or may be in an electronic format and not require a physical form factor (i.e., electronically stored and encrypted account information). Additionally, while the embodiments shown typically refer to a hardware media device it should be understood that a software based module that operates with generic hardware (for example, a personal computer) may serve as the media device described that supports operation described in relation to at least one of the embodiments of the invention.

Generally, the system and processes described with reference to FIG. 2 illustrate a process that with which a set top box or other media device supports a purchase transaction using a "buy it now" operation, e.g., button selection, wherein the purchase transaction is made by an authorized media device.

More specifically, the system 10 includes a media device 14 that communicates over a wireless communication link with remote control 18 (though a remote control is not required). Media device 14 is operably coupled to receive streaming media content from a media server 22 and to provide content interaction indications to media server 22. For example, the content interaction indications may include activation of a "buy it now" feature (generically, a "purchase selection") for products, services and media advertised within the media content.

Media device 14 may be coupled to receive the media content over a computer network, a data packet network, a cable network, a satellite network, or a traditional broadcast television network. Media device 14 may also receive, simultaneously or separately, media via a plurality of transmission channels. For example, media server 22 may receive broadcast television programming over a cable network cable connection or as a wireless broadcast transmission received via an antenna. The media server 22 may convert the received broadcast transmission programming to a packet format for delivery to media device 14 via a data packet network or a computer network. In addition, media server 22 may deliver media received from other media sources to media device 14 over the data packet network or the computer network.

Media server 22 produces advertising and other purchase options (collectively "advertisement") with a tag number 26 to media device 14 for display upon an associated monitor or display. A purchase selection by the user by interaction with remote control 18 in response to an advertisement results in media device 14 generating a purchase selection message 30 that includes tag number 26 identifying a specific advertisement or media source. In the described embodiment, remote control 18 includes a dedicated button, the so called "buy it now" button that, when depressed, prompts remote control 18 to transmit signals to further prompt media device 14 to transmit message 30 as a purchase selection indication.

Payment account information is stored by a smart card 34 that is inserted or installed into a receiving port 38 of media device 14. The payment account information includes traditional payment card data such as track 1, track 2, track 3, magnetic stripe equivalent data (MSD), or payment data conforming to the Europay MasterCard Visa (EMV) specifications identifying information of a traditional payment card magnetic strip. As is known by one of average skill in the art, a traditional payment card magnetic strip includes a plurality of tracks of data, while smart card based payment cards may additionally include MSD or EMV data. One particular prior art format includes three tracks wherein the data on tracks 1 and 2 is formatted by most cards in a consistent manner to improve global readability while track 3 data has not been implemented in such a constant format. Here, tracks are not used as such data is stored in memory. The type of data from the common formats for track 1 and track 2, however, are exemplary of the data stored within smart card 34. The types of data stored by smart card 34 may include the magnetic stripe equivalent data of Track 1 and Track 2 (MSD) or a payment account number, account or card expiration date, usage limits including purchase amounts or totals, a permanent ID of an authorized device that has an established association with the payment account, issuer ID, payment account processor ID, and personal identification number. Additionally, in one embodiment, a user mailing address and a user billing address is included. The payment account processor is a company that processes payment account transactions. Historically, such processing has been on the behalf of payment card issuer companies such as banks and other financial institutions.

Accordingly, media device 14 is operable to retrieve the account information from smart card 34 and to produce the payment account information within message 30. Generally, a form factor and associated interface of smart card 34 and port 38 may include any known topology or structure. Moreover, while the described embodiment includes the media device 14 having port 38 to receive smart card 34 with the payment account information, it should be understood that an alternate embodiment includes remote control 18 having a port to receive the smart card 34. As with the media device 14, a port within remote control 18 may also be of any known topology or structure.

In an alternate embodiment in which a payment account is not associated with a physical form factor such as a plastic credit card or SIM card, a payment account secured software module may be installed into the media device to support the "buy it now" feature. In such case, the media device 14 or remote control 18 may be uniquely identified to support the "buy it now" feature.

The media device 14 includes an identifying number that is a permanent identification number of the media device 14. For example, the media device 14 identifying number may be a serial number assigned to media device 14. One aspect of this identifying number is that the number is non-modifiable. In an alternate embodiment in which a media device comprises a software based module (for example, one installed in a personal computer), the media device identifying number is a non-modifiable identification number associated with the software based media device.

In response to receiving message 30, media server 22 transmits message 42 to a payment card management server 46. Message 42, which operates as a purchase selection indication, includes the media device ID, tag number 26, and the payment account information. Message 42 may be the same as message 30 or may be different but based upon message 30. Message 42 may include additional information such as a shipping address associated with the payment account. Payment card management server 46 then determines a corresponding merchant e-commerce server 50 based upon the tag number and transmits an order 54 to merchant e-commerce server 50. Merchant e-commerce server 50 then engages in payment authorization and settlement communications 58 with a financial payment network 62 to complete the transaction.

Figure 3:
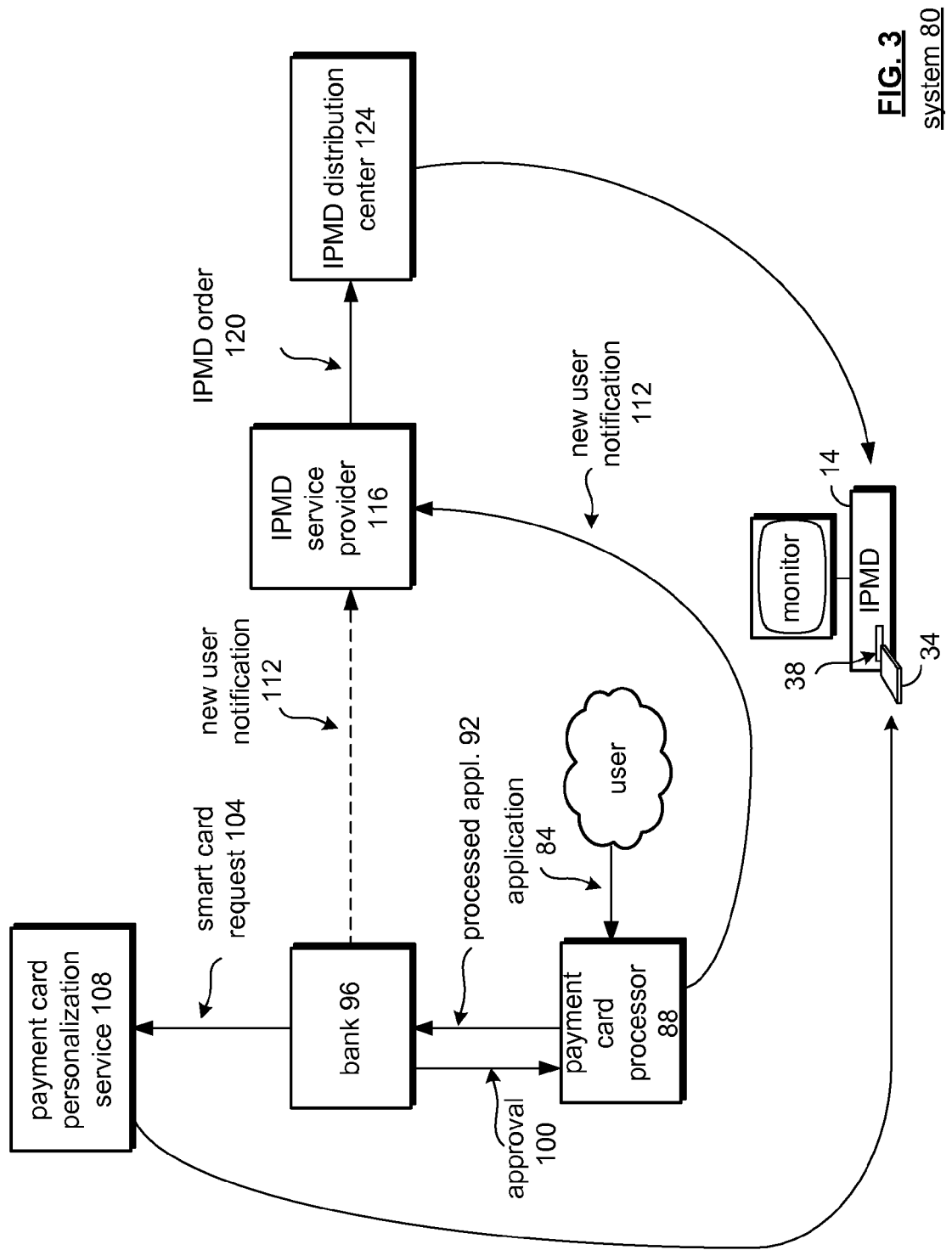
FIG. 3 is a functional block diagram of a system for establishing an established association between a media device and a payment account according to one embodiment of the invention.

FIG. 3 is a functional block diagram of a system 80 that illustrates a process for creating an established association between an authorized media device and a payment account according to one embodiment of the invention. The figures and corresponding text are directed to a media device that is capable of receiving data and communicating over at least one of a plurality of network types. In one specific embodiment, media device 14 (as described here in FIG. 3) is an IP media device (IPMD). Alternatively, the media device may be an IP television (IPTV) set top box. Additionally, in the described embodiment of FIG. 3, the payment account is associated with a smart card 34 produced in the form of a smart card. Generally, a process of system 80 supported according to an embodiment of the present invention is one that establishes an association between a user payment account and an authorized media device, such as media device 14. After such association is made, an IPMD wherein purchase selection messages may only be made for the specified user account by the authorized media device 14.

The process begins with a user generating an application 84 for a new payment account and producing the application 84 to a payment card processor 88. Payment card processor 88 is, for example, a credit card company that processes credit cards for issuer companies such as banks and other financial institutions or for the bank itself. In general, references herein to "payment card processor" are references to payment card processing entities or companies. The user may utilize a web based interactive program or may physically deliver a paper application to the payment card processor 88, which then produces processed application 92 in an electronic form to bank 96 for processing. Processed application 92 is based on application 84.

While the example of FIG. 3 illustrates the user providing the application directly to payment card processor 88, it should be understood that the user may also deliver the application to any other entity that subsequently provides the application to the payment card processor 88 including bank 96 and an IPMD service provider. Accordingly, payment card processor 88 generates a processed application 92 to bank 96. Bank 96 then approves or denies processed application 92.

Upon approving processed application 92, bank 96 generates an approval 100 to payment card processor 88. Bank 96 also generates a smart card request 104 to payment card personalization service 108. Upon receiving approval 100, payment card processor 88 generates a new user notification 112 to IPMD service provider 116. In an alternate approach, bank 96 generates and transmits new user notification 112 to IPMD service provider 116 after bank 96 approves processed application 92. IPMD service provider 116 then transmits an IPMD order 120 to IPMD distribution center 124. IPMD distribution center 124 then ships an IPMD to the user. Finally, during this process, payment card personalization service 108 ships smart card 34 for insertion into port 38 of IPMD 14. In the embodiment in which the IPMD comprises an IPTV set top box, for example, IPMD distribution center 124 sends the IPTV set top box to the user.

In one embodiment of the invention, smart card 34 includes a serial number or other identification number of media device 14. This serial number is a non-modifiable number and is hardware based. Accordingly, subsequent purchase orders can only be approved if the ID number stored on the smart card and the ID of the media device match when a purchase selection is made by an authorized media device in one embodiment of the invention. The process includes media server service provider 116 producing the hardware ID number to either bank 96 or payment card processor 88 for delivery to payment card personalization service 108. In general, the ID of the authorized media device must match the ID of a media device that generates a purchase selection message for an account having an established association with the media device before a purchase approval can be generated.

Figure 1:
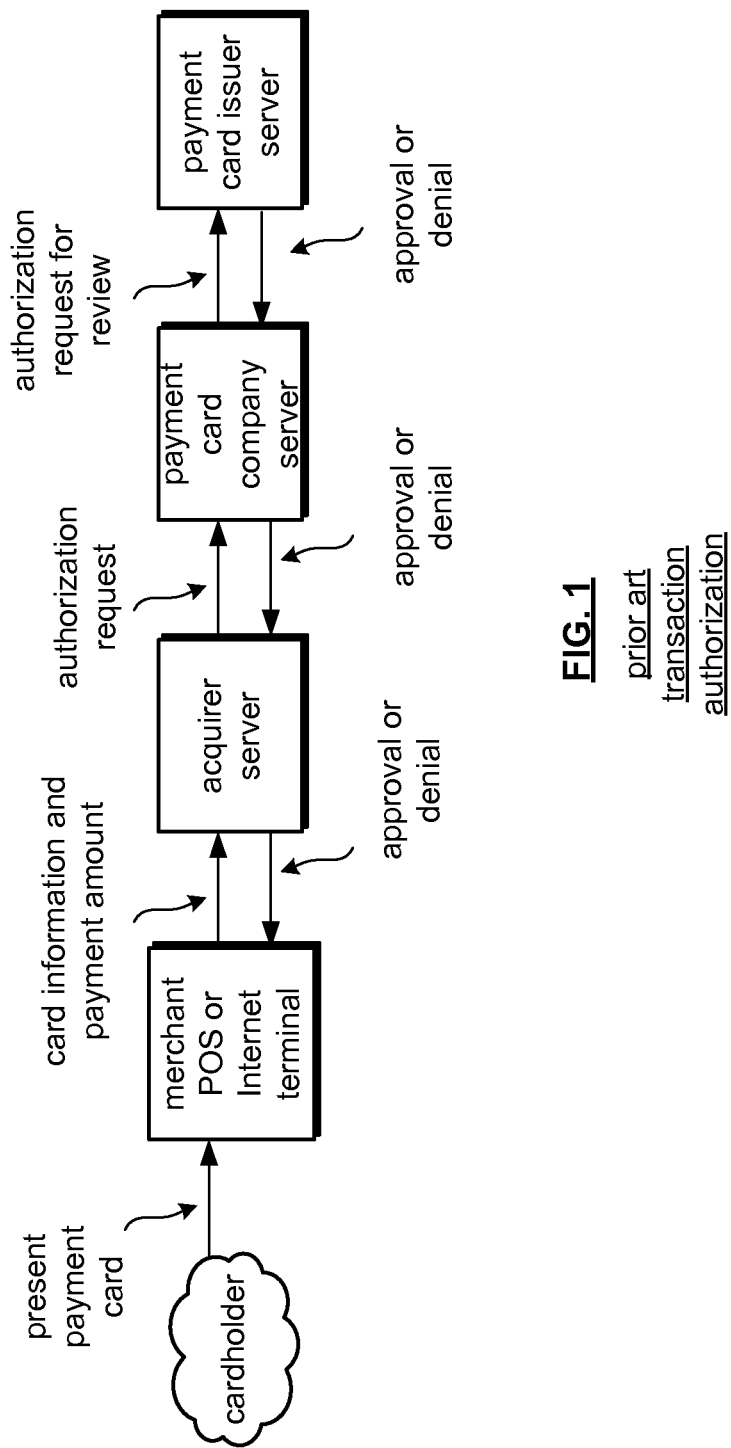
FIG. 1 is a functional diagram that illustrates a payment card authorization process that can support a typical e-commerce transaction according to the prior art.

Payment card personalization service 108 is, in one embodiment, an element of a network operable to generate personalized smart cards that include account information as well as encryption keys and other information to support the creation of secure smart cards. For example, U.S. Pat. No. 6,367,011 to Lee et al. provides details of one smart card personalization system which, as shown in FIG. 1 of Lee et al., includes elements at the issuer location as well as elements at a "personalization location."

The methods and apparatus of the embodiments of the invention are applicable to Internet based media devices that operably couple to an associated media server from which media content or associated products or services may be purchased over a public network. For example, the concepts herein are applicable to game systems such as the Sony Wii™, Gamecube™, and XBox™ and other similar systems. Generally, though, media content and advertisements for products and services are produced to a display device to allow a user to make purchases associated with the media content and advertisements merely by pressing the so called "buy it now" button on a remote control, a dedicated button on the system, or a so called "soft button" of a graphic display. A display for displaying media with advertising may comprise any known display device including television sets, traditional monitors, LCD displays, or projectors. These displays may be separate or integrated into the media device. For example, the display may be an LCD screen of an audio player such as an MP3 player. Many such systems include an ability to communicate over an IP network though the ability to communicate over an IP network is not required. Generally, the embodiments include any system that is operable to deliver media to the user device and to receive a purchase indication from the user device through the same or a different network while a purchase transaction is pending.

FIG. 4 is a functional block diagram of a device 130 that is operable to receive and process an application for a payment account that is to be associated with media device 14 according to one embodiment of the invention. Device 130 includes an input/output module 132 operable to receive user inputs from a keyboard, mouse and other user input devices and further to generate display signals and/or audio signals for display on a display device and for playing sound through a speaker system, respectively, to create a user interface with device 130. As such, device 130 is operable to receive an application directly from a user in addition to receiving the application over the Internet. A processing module 134 is operable to communicate with input/output module 132 and to process incoming signals based upon user input and upon signals received over the Internet. Memory 130 is operable to store computer instructions and data.

The processing module 134 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information.

Note that when the processing module 134 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-3 and in the Figures that follow FIG. 4.

Continuing to refer to FIG. 4, processing module 134 of device 130 is operable to retrieve computer instructions from memory 136 which instructions define operational logic of device 130 including logic for performing the method steps of at least one embodiment of the invention described herein this specification. For example, the logic defined by the computer instructions support application processing for payment accounts that will be associated with a media device. Finally, processing module 134 is operable to engage in wireless and wired communications through various data packet networks and wireless communication networks via network communication module 138 to support the various method steps described herein.

More specifically, processing module 134 is operable to communicate with the input/output module 132, network communication module 138, and memory 136 to execute the computer instructions stored within memory 136. Based upon at least one of the stored data in memory 136, the received data from network communication module 138, and the user data entry received from input/output module 132, processing module 134 is operable to receive and process an application for a media device associated payment account, transmit an approved application indication, and support or establish an established association between the payment account and media device 14.

Figure 5:
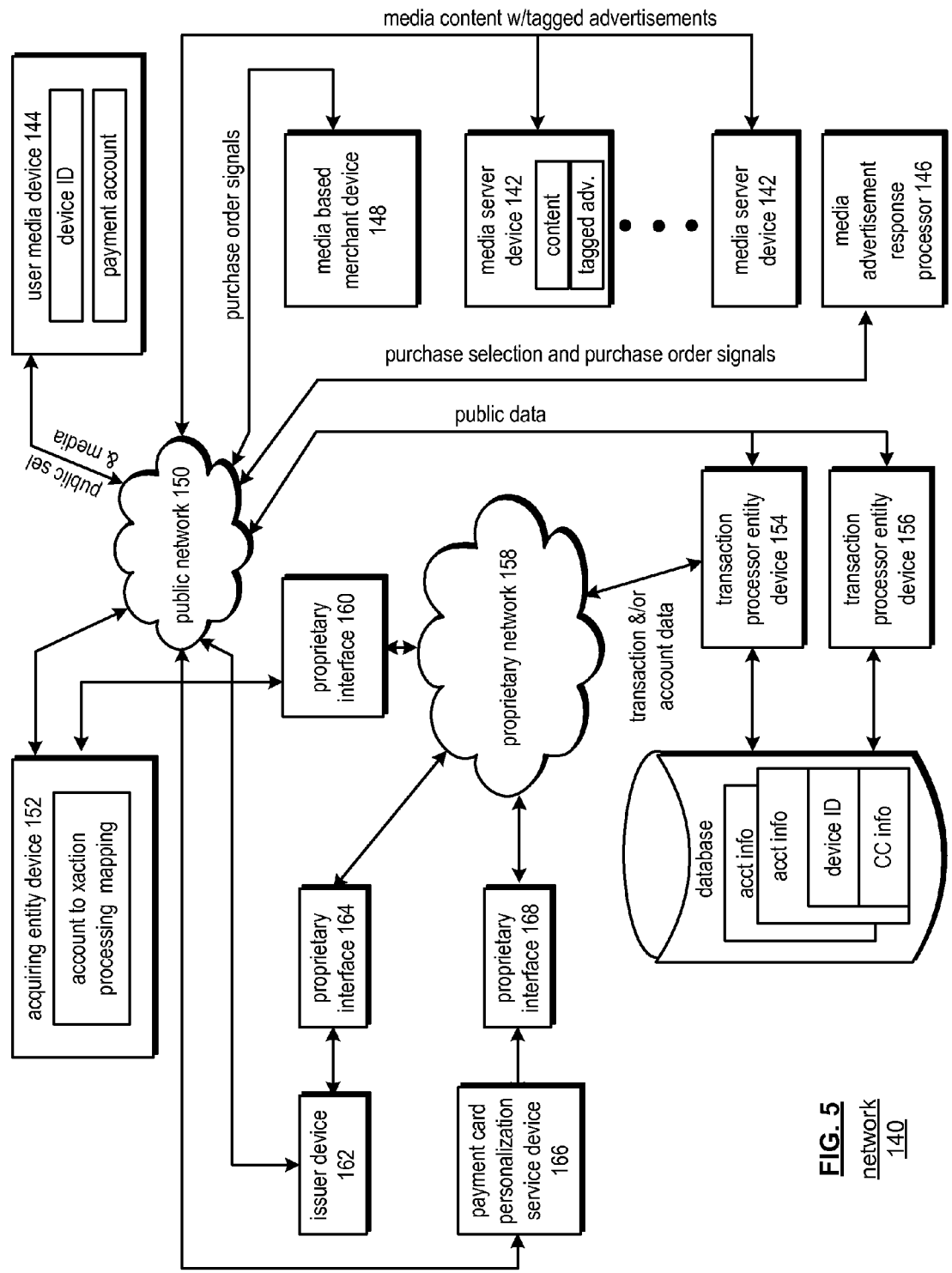
FIG. 5 is a functional block diagram of a network operable for establishing and supporting electronic transactions according to one embodiment of the invention.

FIG. 5 is a functional block diagram of a network operable for establishing and supporting electronic transactions according to one embodiment of the invention. Network 140 generally comprises financial network devices that interact with media service provider devices, merchant devices and user media devices having an ability to establish and subsequently support a purchase selection. More specifically, the network elements or devices of network 140 are operable to initially support creation of personalized payment cards and to subsequently support electronic transactions using the payment cards. In at least one embodiment, the payment cards are smart cards have a form factor similar to subscriber identity module (SIM) cards in that they may be received by SIM card reader to communicate with a computer or other device that has a port or interface to communicate through a SIM card reader with the smart card. In one particular embodiment, through not required, the smart card is formed as an actual SIM card.

Here, the payment card, with associated payment account track 1-3 type data, as well as other information, may be encrypted and protected by the smart card. In one embodiment, the data is partially encrypted to allow access to certain types of data while protecting other types of information. Examples of payment data which may be fully protected, partially protected or not protected all according to implementation include payment account number, expiration date, usage limits including purchase amounts or totals, a permanent ID of an authorized device that has an established association with the payment account, issuer ID, payment account processor ID, and personal identification number. One aspect of network 140 is that network 140 is operable to support an application and account creation process that results in a payment account having an established association with a specified user media device from which a user may initiate purchase transactions using the payment account.

Network 140 includes a media server device 142, a user media device 144, a media advertisement response processor 146, and a media based merchant device 148 that are all coupled to communicate through one or more public networks 150. Media server device 142 is operable to provide media content and tagged advertisements to user media device 144.

Media server device 142 can be, for example, a device that delivers media by way of wireless communication channels and/or wired networks. The wireless networks can comprise the wireless cellular networks, satellite based wireless networks, or even public wireless local area networks and wireless wide area networks. The wired networks can be any known technology including cable networks for delivering so called broadcast television programming content, the public switched telephone networks, or computer and data networks such as Internet Protocol networks. According to implementation, these various types of networks can be used either for delivery of media content, delivery of communication messages that support an electronic transaction, or both. For example, one type of network may be used for delivering the media content while another is used to conduct purchase related communications. Alternatively, one type of network may be used for both.

Continuing to refer to FIG. 5, network 140 includes an acquiring entity device 152 of a payment card acquirer company that is operable to communicate with media based merchant device 148 over public network 150 as well as with a payment account processor entity device 154 or 156 of a payment account processor company by way of a proprietary network 158. Acquiring entity device 152 includes a mapping of user payment accounts with transaction processing entities such credit card processing companies.

A proprietary interface 160 is utilized to enable acquiring entity device 152 to communicate through proprietary network 158. An issuer device 162 also is coupled to communicate through both the public network 150 and through proprietary network 158 by way of interface 164. Similarly, a payment card personalization service device 166 is coupled to communicate through both the public network 150 and through proprietary network 158 by way of interface 168. Finally, as shown, each transaction processor entity device 154 is operable to communicate with one or more databases that include payment account information and a permanent ID of a module or media device from which authorized purchase transactions may be initiated.

In operation, media server device 142 is operable to produce media with a tag number for identifying items or services that may be purchased by a user. Accordingly, user media device 144 is operable to receive and play the media content for advertisements or advertised items. Media device 144 is also operable to produce purchase selection indications to media server device 142 with the advertisement tag number to identify the advertisement that corresponds to the purchase selection indications. In an alternate embodiment, the purchase selection indications are produced to media advertisement response processor 146. Here, a first type of public network delivers media to user media device 144 and a second type of network delivers user media device responses to media server device 142 or to media advertisement response processor 146. A public network 150 is used for delivery of the media content though a private network may be used instead.

Once either device 142 or 146 receives a purchase selection indication, device 142 or 146 is operable to forward the purchase selection indication to merchant device 148 over public network 150. Merchant device 148 is then operable to generate and provide a purchase authorization request to acquiring entity device 152. Acquiring entity device 152 then forwards the purchase authorization request to a transaction processor entity device 154 by way of proprietary network 158. The transaction processing entity device then performs several authorization processing steps including evaluating account standing and verifying that all authorization associated data appears to be proper according to implemented guidelines. Transaction processor entity device 154 then forwards the authorization request to a payment account issuer device 162. Payment account issuer device then makes a final authorization decision to approve or deny the authorization request.

User media device 144 is operable to provide payment account information and an ID of user media device 144 along with the purchase selection indication. Accordingly, at least one of the media server device 142, the media advertisement response processor 146, the acquiring entity device 152 and the issuer device 162 is operable to compare the user media device ID to the payment account information as a part of determining whether to approve (or forward) the authorization request.

Media server device 142 is operably disposed to communicate through public network 150 with merchant device 148 that is identified by the tag number of an advertisement. Merchant device 148 is further coupled to communicate over public network 150 with acquiring entity device 152 to initiate transaction approval and settlement processing. Generally, acquiring entity device 152 is operable to receive the authorization request for a purchase transaction and to communicate with at least one device in a financial network through a proprietary interface and/or network to request and receive a purchase authorization approval.

An additional aspect of the operation of network 140 is that any of devices 142, 148, 154 and 162 is operable to provide account application information including at least a portion of an account number directly or indirectly to payment card personalization service device 166. Payment card personalization service device 166 is operable to receive the permanent ID of user media device 144 to embed the permanent ID within the data stored within the payment card. For example, the ID may be stored in an encrypted form in a smart card along with other account information to create an established association between the account and the user media device 144.

In an alternate embodiment, an established association between the account and the user media device may be created through an initial communication. Here, devices 154 and 162 are operable to establish a common encryption key with one of user media device 144 or smart card 34 installed within user media device 144 to generate an encryption key for protecting data in purchase transactions initiated by the (authorized) user media device. This encryption key is then used to protect at least a portion of the account information. Accordingly, the encrypted portion of the account information will only be properly decrypted if an authorized ID is provided as a part of a purchase selection since the provided ID will be used to select an encryption key for a received authorization request. In general, a user media device ID is transmitted as a part of or in association with a purchase selection and, if the ID is one that has an established association with the payment account identified in the transaction and/or account data, then the transaction may be approved or forwarded to a different device for approval.

FIG. 6 is a functional block diagram of a computer network 170 operable to support payment authorization processing according to one embodiment of the invention. A plurality of media based merchant devices 172-174 are each operable to generate and provide transaction and/or account data and to transmit such data through a public network 176 to an acquiring entity device 178. Acquiring entity device 178 is then operable to provide the transaction and/or account data to an in-band processing entity device 180 or to an out of band transaction processing entity device 182. Here, in-band processing entity device 180 is further operable to provide the transaction and/or account data to an issuer device 184.

The transaction and/or account data is transmitted as a part of an authorization request for approval of a pending purchase selection. The transaction and/or account data includes an ID of a user media device that generated the purchase selection request. The acquiring entity device 178 comprises a plurality of processing modules including, in the described embodiment, a prepaid account processing module, a credit account processing module, and a group account processing module.

Based upon the transaction and/or account data, a corresponding module of the modules of device 178 process the transaction and/or account data to determine which processing entity device should receive the transaction and/or account data. For example, for a credit account or group account, an in-band processing entity such as entity 180 may be the device to which the transaction and/or account data should be transmitted. Similarly, for a prepaid account, the prepaid account processing module may determine that an out-of-band transaction processing entity such as entity 182 should receive the transaction and/or account data. Generally, FIG. 6 illustrates that a single acquiring entity device may interact with a plurality of merchant devices 172-174 as well as a plurality of processing entity devices 180-182.

Any one of acquiring entity device 178, in-band transaction processing entity device 180, out-of-band transaction processing entity device 182, or issuer device 184 is operable to determine if the permanent ID of the media device that transmitted the purchase selection indication is one that corresponds to and is authorized to initiate purchase selections for the payment account identified by the payment account information. Such a determination may be made based upon an established association between the payment account and the device ID in a plurality of described approaches.

FIG. 7 is a functional block diagram of a payment card according to one embodiment of the invention. Payment card 34 is a smart card and includes a plurality of magnetic stripe equivalent (MSD) data blocks including track account data blocks 190-192, an encryption data block 194 and a media device ID data block 196. Any or all of the MSD data blocks 190-196 may be encrypted or may include encrypted data. The "track account" data (i.e., magnetic stripe equivalent data) of blocks 190-192 is merely the type of data that has historically gone into so called track 1, track 2, or track 3 of a magnetic strip of a payment card. Here, two track account data blocks are provided in which one includes encrypted data and one includes unencrypted data though the payment card may including additional account data blocks. Encryption data block 194 includes an encryption key for encrypting data and/or for encrypted communications between the smart card (payment card 34) and another device such as a processing entity device 180 or issuer device 184. In one embodiment, a smart card personalization service creates a unique derived key from a master key that is stored within encryption data block 194. If the master key is altered in a subsequent process, the new unique derived key is stored within encryption data block 194. Media device ID block 196 includes a media device ID that was received by the smart card personalization service for associating with a payment account. In one embodiment of the invention, the unique derived key is derived using the media device ID 196 as derivation data.

FIG. 8 is a functional block diagram of a computer system 200 that performs an exemplary process for creating an established association between a payment account and a media device according to one embodiment of the invention. Referring now to FIG. 8, payment card company server system 204 is operable to communicate with a user 208 to receive a payment account application that is to be associated with media device 14. For exemplary purposes, user 208 is coupled to and communicates with payment card processor server 220 through a secure IP tunnel 212 over a data packet network such as the Internet 216. Alternatively, user 208 may enter such application using a keyboard, mouse, and display coupled to payment card processor server 220 or to financial institution issuer server 224.

Secure IP tunnel 212 is an encrypted communication that is transmitted through wired and/or wireless communication paths within one or more data packet networks such as the Internet. Any known technology for securing data packet transmissions through wired and wireless communication links may be included. Hereinafter, all references to secure IP tunnels and/or secure communication channels should be understood to refer to encrypted and protected communication through at least one of a wired or wireless network and may include encrypted transmissions through known data packet networks such as Internet 216. Moreover, in the embodiments that follow, it should be understood that at least a portion of the payment account related data is encrypted whether or not shown or described in relation to the figures in addition to encryption of communications between devices.

Payment card company server system 204 includes at least one of a payment card processor server 220 and a financial institution issuer server 224. Generally, the various embodiments of network 200 and, more specifically, payment card company server system 204 may include a single payment card processor server 220, a single financial institution issuer server 224, or both. In an embodiment that comprises both, payment card processor server 220 communicates with financial institution issuer server 224 over a secure IP tunnel.

In system in which payment card company server system 204 includes only one server 220 or 224, either server 220 or 224 performs the same basic tasks of receiving and approving applications and supporting the creation of a smart card based payment account that is to have an established association with a media device 14. Thus, it may be seen that either a payment card processor company, for example, Visa, Inc., or a financial institution, may perform all of payment account application processing that has historically been performed jointly by both institutions. Accordingly, in the various embodiments of the invention, a system 200 may comprise one processor server 220, one issuer server 224, or both to support the creation of a payment account that is to have an established association with a media device 14 as an authorized media device. Payment card processing server system 204 therefore reflects any of these embodiments. Generally, supporting the creation of a smart card based payment account includes any of the steps or transmission of any of the messages described herein for system 204 or for servers 220-224.

Payment card processing server system 204 is therefore operable to generate an approved indication to a smart card personalization service server 228 over a secure IP tunnel 232 after the application has been approved. Each smart card personalization server such as smart card personalization server 228 is similar to payment card personalization service 108 of FIG. 3 in that server 228 may represent but one element of a system that supports smart card creation and personalization. The approved indication includes customer payment account information that is to be embedded within a smart card 34 generated by smart card personalization service server 228.

Payment card processing server system 204 is also operable to transmit a media device new user account indication to a media device service provider server 202 over a secure IP tunnel 206 through a data packet network or other public network such as the Internet. Media server service provider server 202 is then operable to transmit an order to media server distribution center server 210 over secure IP tunnel 214. In response, media server distribution center server 210 prompts the mailing or delivery of a media device to user 208. Additionally, in one embodiment, media server distribution center server 210 is operable to produce the media device identifying number for the media device being sent to user 208 to one of payment card processing network 218 over secure IP tunnel 222 or to payment card company server system 204 by way of secure IP tunnel 226. This identifying number is transmitted to support subsequent payment authorization and settlement processes that evaluate a media device user payment account in relation to the media device identifying number and, more generally, to support the creation of an established association between media device 14 and the payment account for user 208.

If the media device identifying number is produced to payment card processing server system 204 by server 210 and not to PCP network 218, in an alternate embodiment, then payment card processing system server system 204 is operable to distribute the media device identifying number to PCP network 218 as necessary to support payment authorization and settlement processes. For example, payment card processing system server 204 is operable to transmit the media device identifying number and at least a portion of the associated media device payment account information to at least one of a transaction authorization network server to support the authorization of transactions based in part upon the media device identifying number and/or to a settlement processing network server to support the settlement of transactions based in part upon the media device identifying number.

Figure 9:
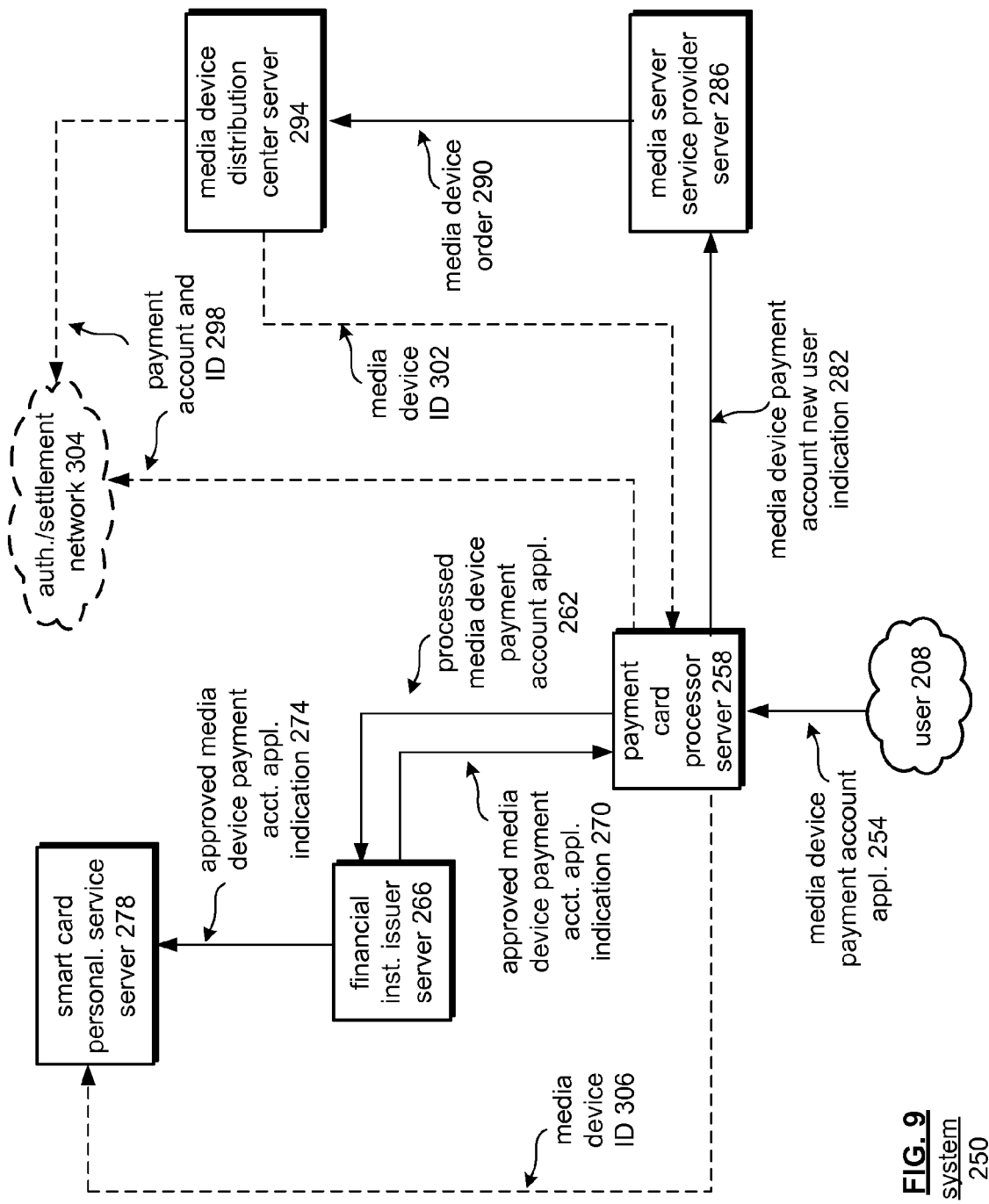
FIG. 9 is a functional block diagram of a computer system that includes a payment card company server and a financial institution issuer server that jointly support creating an established association between a payment account and a media device according to one embodiment of the invention.

FIG. 9 is a functional block diagram of a computer system 250 that includes a payment card processor server 258 and a financial institution issuer server 266 that jointly support creating an established association between a payment account and a media device according to one embodiment of the invention. A user 208 provides a media device payment account application 254 to payment card processor server 258 for a payment account for use in association with a media device such as media device 14 of the prior figures. The application may be provided through manual entry or in an electronic form, through a computer network or Internet connection as described in relation to FIGS. 3-5 and 7-8. Payment card processor server 258 then generates message 262 which includes processed media device payment account application to financial institution server 256.

Processed media device payment account application 262 is based upon the media device payment account application 254 and may include additional information such as an application reference number or other application identifying information. The information is provided in a defined format to enable financial institution issuer server 266 to receive and further process the application. A flexible extended markup language type protocol may be used, for example, for the defined format.

Financial institution issuer server 266 then generates message 270 which includes an approved media device payment account application indication to payment card processor server 258. This indication in message 270 may be based upon a user input. For example, a credit or loan officer of the financial institution may approve the application and enter such approval to allow financial institution issuer server 266 to transmit message 270. Alternatively, logic executed by financial institution issuer server 266 allows, at least in some conditions, for approval of the media device payment account processed application of message 262.

The approved media device payment account application indication in message 270 specifically includes the application reference number or identification information. Additionally, financial institution sever 266 also generates message 274 which includes the approved media device payment account application indication to smart card personalization service server 278 to facilitate creation of a smart card based user smart card payment account. The approved media device payment account application indication of message 274 includes a user 208 mailing address as well as additional user 208 payment account information to allow smart card personalization service server 278 to prompt a mailing of a generated smart card with the user 208 payment account information to user 208.

Payment card processor server 258 generates message 282 which includes a media device payment account new user indication to media server service provider server 286. Media server service provider server 286 then generates media device order in a message 290 to media device distribution center server 294. Media device distribution center server 294, in response to receiving message 290, initiates a delivery or mailing of a media device 14 to user 208. Additionally, in one embodiment, media device distribution center server 294 then produces message 298 which includes media device payment account information and the media device ID to authorization and settlement network elements or devices of authorization and settlement network 304. The authorization and settlement network 304 is similar to and may include one or more of the financial network elements or devices of FIG. 5 to support, as necessary, the established association between payment accounts and media devices. Media device distribution center server 294 is also operable to provide the media device ID in message 302 to payment card processor server 258 to allow payment card processor server 258 to take one or more subsequent steps to create the established association between the media device based on the media device ID received in message 302 with the user 208 payment account.

Payment card processor server 258, for example, may subsequently transmit message 298, in an embodiment in which server 294 does not generate message 298, to authorization and settlement network elements of authorization and settlement network 304. Additionally, payment card processor server 258 is operable to produce the media device ID in a message 306 to smart card personalization service server 278 to enable smart card personalization service server 278 to include the media device ID of message 306 within the user 208 payment account information to support creating the established association between the payment account and media device 14. Message 306 may include additional information to enable smart card personalization service server 278 to associate the media device ID to the correct payment account.

Figure 10:
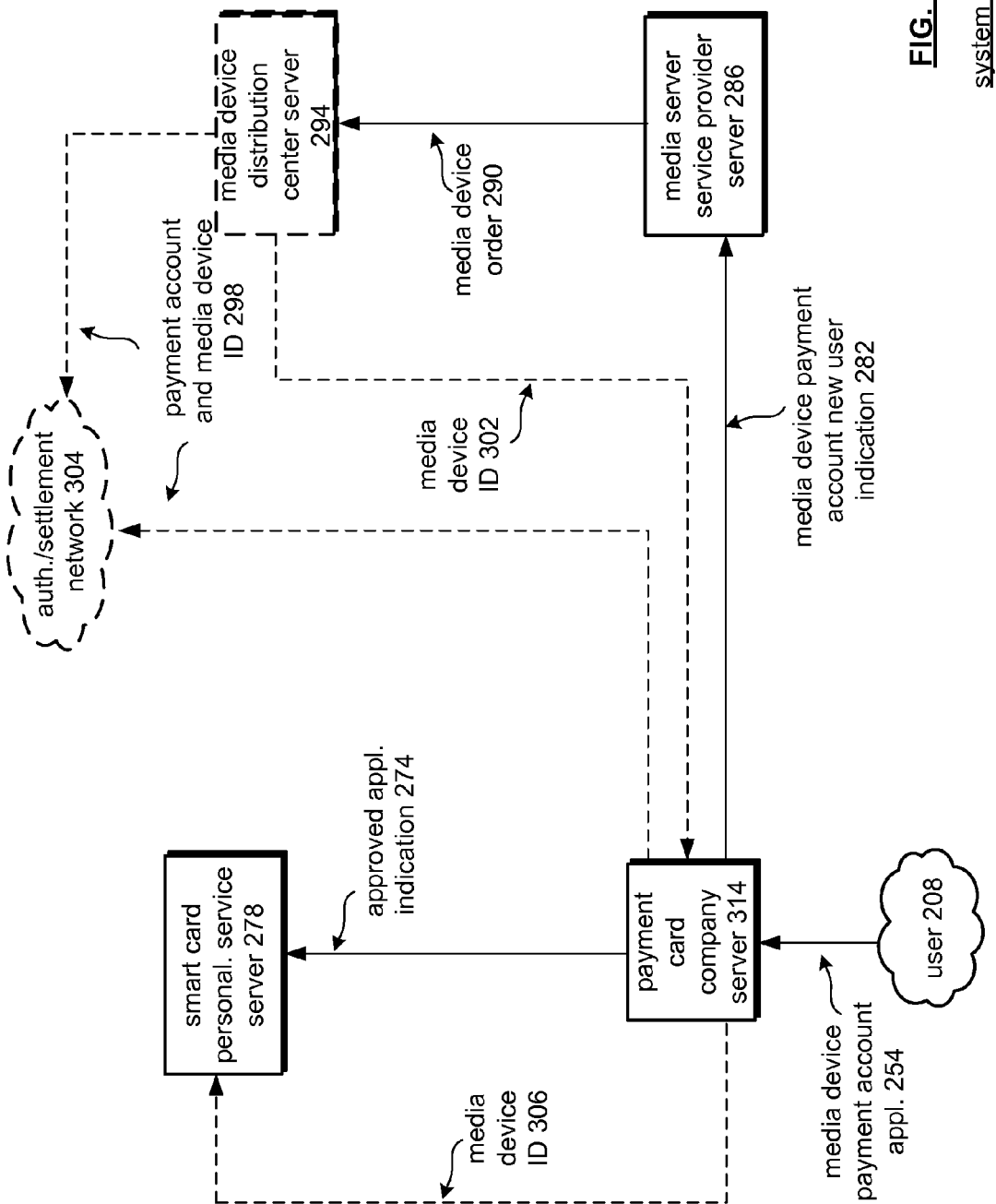
FIG. 10 is a functional block diagram of a computer system that includes a payment card company server operable to support creating an established association between a payment account and a media device according to one embodiment of the invention.

FIG. 10 is a functional block diagram of a computer system 310 that includes a payment card company server 314 operable to support creating an established association between a payment account and a media device according to one embodiment of the invention. In general, references herein to "payment Card Company" are intended to relate to companies that serve in the role of a payment card processing company such as a credit card processing company, or to a payment card issuer such as a bank or other financial institution, or to a combination of an issuer and a processing company. Accordingly, a payment card company server such as server 314 is one that is capable of performing functionality of any issuer server and/or any payment card processor server and represents one or more servers.

Returning to FIG. 10, a user 208 provides a media device payment account application 254 to payment card company server 314 for a payment account for use in association with a media device such as media device 14. Payment card company server 314 is operable to support approval of the media device payment account application and then to generate message 274. Message 274 includes an approved application indication and is transmitted to smart card personalization service server 278 to facilitate creation of a smart card that includes payment account information.

The approved application indication of message 274 includes a user 208 mailing address as well as additional user 208 payment account information. This allows smart card personalization service server 278 to prompt a mailing of a generated smart card with the user 208 payment account information to user 208. This indication of message 274 may be based upon a user input wherein, for example, an approval of the application by a credit or loan officer of the financial institution. Alternatively, the indication of message 274 may be based upon logic executed by a payment card company server that allows, at least in some conditions, for approval of an application based upon the data provided within a media device payment account application.

Payment card company server 314 also generates message 282 which includes a media device payment account new user indication to media server service provider server 286. Media server service provider server 286 then generates media device order in message 290 to media device distribution center server 294. Media device distribution center server 294 then initiates a delivery or mailing of a media device 14 to user 208. Additionally, in one embodiment, media device distribution center server 294 then produces media device payment account information and a media device ID in message 298 to authorization and settlement network elements of authorization and settlement network 304. Media device distribution center server 294 is also operable to optionally provide the media device ID in message 302 to payment card company server 314. Payment card company server 314 is operable to then take one or more subsequent steps to create an established association between the media device and the user 208 payment account.

Payment card company server 314, for example, may subsequently transmit payment account information and the media device ID in message 298 to authorization and settlement network elements of authorization and settlement network 304 in place of server 294 sending message 298. Additionally, payment card company server 314 may produce the media device ID in message 306 to smart card personalization service 278. This enables smart card personalization service server 278 to include the media device ID received in message 306 within the user 208 payment account information to support approval and settlement processes that are based upon both user account information and an ID of a media device server 14. Message 306 includes the media device ID in message 302 and may also include additional information to enable smart card personalization service server 278 to associate the media device ID to the correct payment account.

The operation performed in relation to FIG. 10 and its description herein may be modified, for example, by substituting payment card company server 314 with a financial institution issuer server 266, for example, wherein financial institution issuer server 266 performs all of the steps and message transmissions described for payment card company server 314. Here, the financial institution server operates as payment card company server 314. Accordingly, for such an embodiment, any reference to payment card company server 314 includes financial institution issuer server 266.

In current processes, the roles of the payment card processor company and financial institution are distinct and thus a process as illustrated in relation to FIG. 9 may be implemented. If payment card processor companies and financial institutions expand their roles to overlap with tasks traditionally performed by the other, then an embodiment of the invention similar to that described here in FIG. 10 could be realized. The payment card company server may be a part of a network or system of any entity that enters the space of issuing payment cards as well as the credit or monetary balances to facilitate the settlement process for approved purchases.

Figure 11:
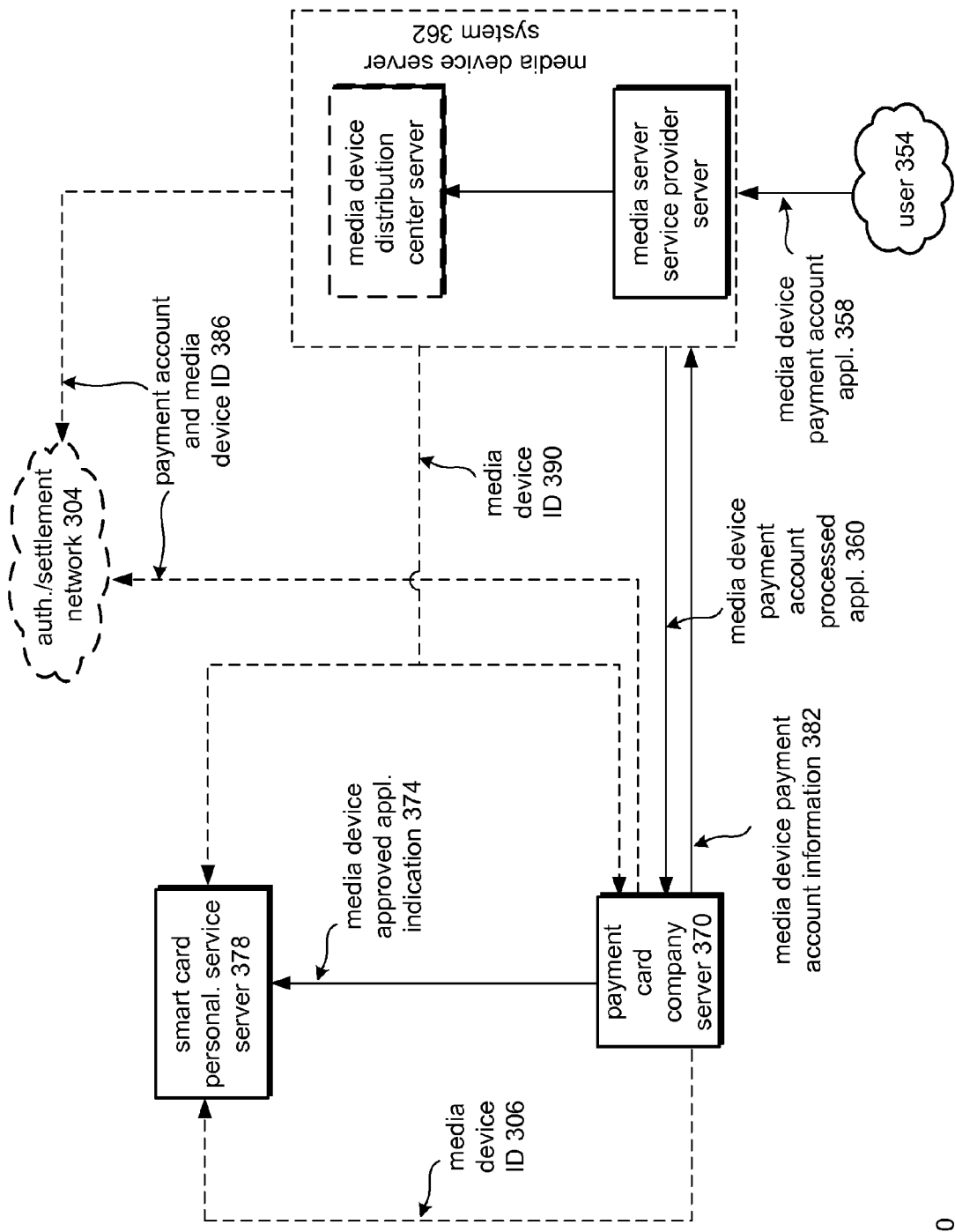
FIG. 11 is a functional block diagram of a computer network that includes a payment card company server operable to support creating an established association between a payment account and a media device according to one embodiment of the invention.

FIG. 11 is a functional block diagram of a computer system 350 that includes a payment card company server operable to support creating an established association between a payment account and a media device according to one embodiment of the invention. A user 354 provides a media device payment account application 358 to media device server system 362 for a payment account for use in association with a media device such as media device 14. As may be seen, media device server system 362 may include both a media server and a media device distribution center server. The functionality of these two servers may readily be rearranged or distributed across a different number of servers or may even be combined into one server. Each such embodiment is represented by media device server system 362. Each of the described embodiments may be similarly modified.

Media device server system 362 is operable to generate a media device payment account processed application 360 in an electronic form to payment card company server 370. As before, payment card company server 370 is a server that is in operable, among other tasks, to initiate a payment card and account generation process. Moreover, payment card company server 370 can comprise any of the embodiments of payment card company server system 204 of FIG. 8. Stated differently, server 370 may comprise a single module similar to server 314 of FIG. 10 or a plurality of modules similar to servers 258 and 266 of FIG. 9.

Payment card company server 370 is then operable to generate message 374 which includes a media device approved application indication to smart card personalization service server 378 to facilitate creation of a smart card for a payment account. The media device payment account approved application indication of message 374 includes a user 354 mailing address as well as additional user 354 payment account information Payment card company server 370 generates message 382 which includes media device payment account information to media device server system 362. The media device payment account information of message 382 may comprise an indication that the account is approved. Message 382 comprises at least some of the payment account information to allow media device server system 362 to perform an initial authorization for a user selected charge using the "pay it now" feature described previously. Generally, references to transmitting payment account information include transmitting any portion of the payment account information including all of the payment account information that is stored within or received by a device.

Additionally, in one embodiment, media device server system 362 then produces message 386 which includes media device payment account and the media device ID to authorization and settlement network elements of authorization and settlement network 304. Media device server system 362 is also operable to provide message 390 which includes the media device ID to payment card company server 370 to allow payment card company server 370 to take one or more subsequent steps to create the established association between the media device ID 390 (and therefore the associated media device) and the user 354 payment account. In one embodiment, media device server system 362 is further operable to provide message 390 which includes the media device ID directly to smart card personalization server 378 to enable the generation of smart cards having not only payment account information, but also the media device ID.

Figure 12:
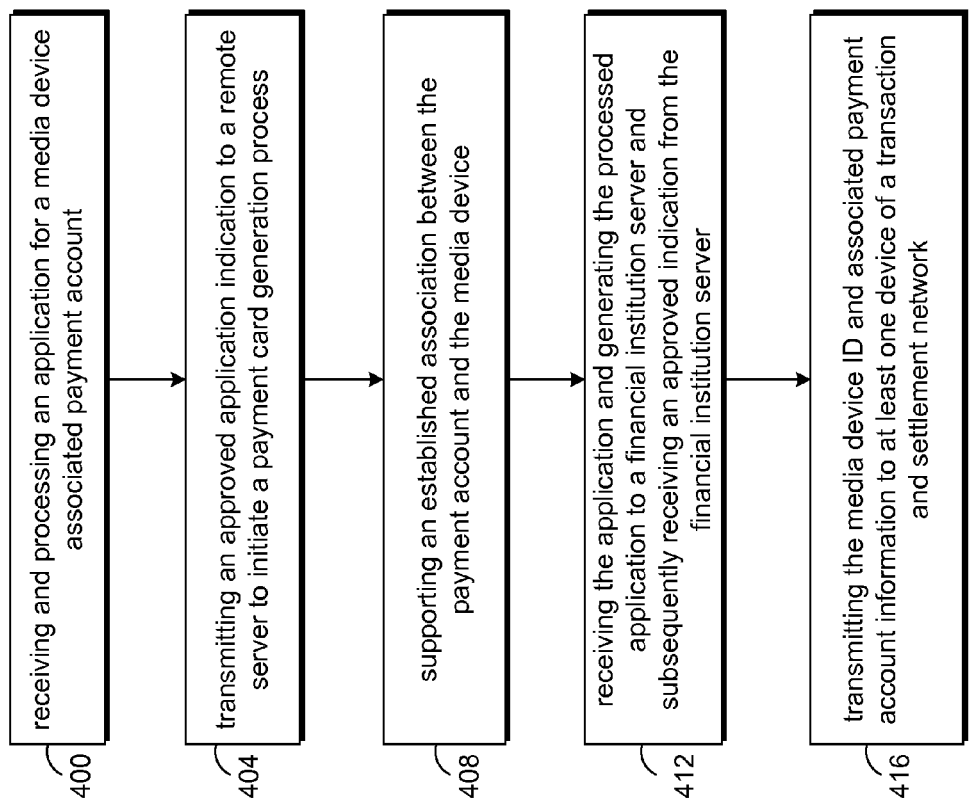
FIGS. 12-15 are flow charts that illustrate method steps for a payment account according to a plurality of embodiment of the invention.

FIG. 12 is a flow chart that illustrates a method for a payment account according to one embodiment of the invention. The method initially includes receiving and processing an application for a media device associated payment account (step 400). Thereafter, the method includes transmitting an approved application indication to a remote server to initiate a payment card generation process (step 404). Additionally, the method also includes taking one or more steps supporting an established association between the payment account and the media device (step 408).

The method also includes, in one embodiment, receiving the application and generating the processed application to a financial institution server and subsequently receiving an approved indication from the financial institution server (step 412). Finally, the method includes determining and transmitting a media device identification number (ID) and at least a portion of the media device associated payment account information to at least one device or element of a transaction authorization and settlement network to support the authorization of transactions based in part upon the media device ID (step 416).

Figure 13:
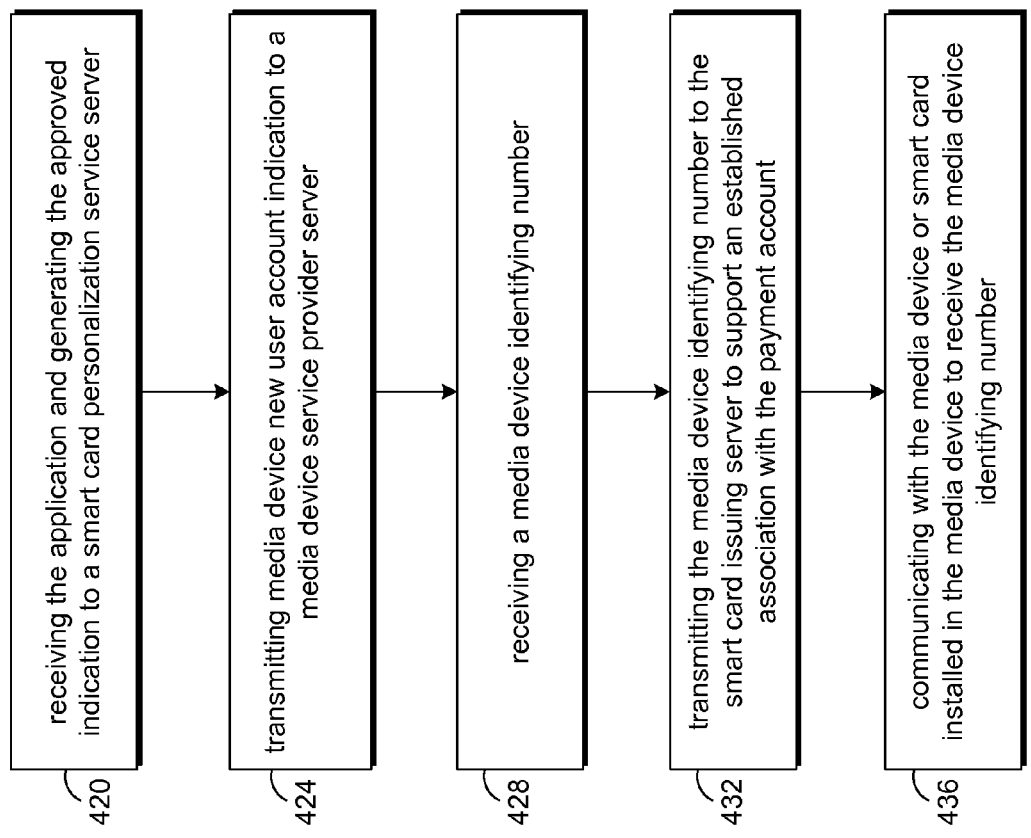

FIG. 13 is a flow chart that illustrates a method for a payment account according to one embodiment of the invention. The method steps of FIG. 13 include, receiving the payment account application, and generating an approved application indication to a smart card personalization service server (step 420). After the account is approved, the method further includes transmitting a media device new user account indication to a media device service provider server (step 424). The method also includes receiving a media device identifying number (step 428). Thereafter, the method includes transmitting the media device identifying number to the smart card issuing server to support an established association with the payment account (step 432). The media device identifying number is an unalterable identifying number such as a serial number of a hardware device or software module.

The method includes an optional step of communicating with the media device or a smart card installed in the media device to receive the media device identifying number (step 436). A secure connection is established with either the media device or with the smart card installed in the media device to enable the payment card processing server to receive the media device ID directly from the media device or the smart card installed in the media device. This step may further include determining an encryption key for data, especially payment account information that is to be transmitted by the media device with a purchase selection indication.

Figure 14:
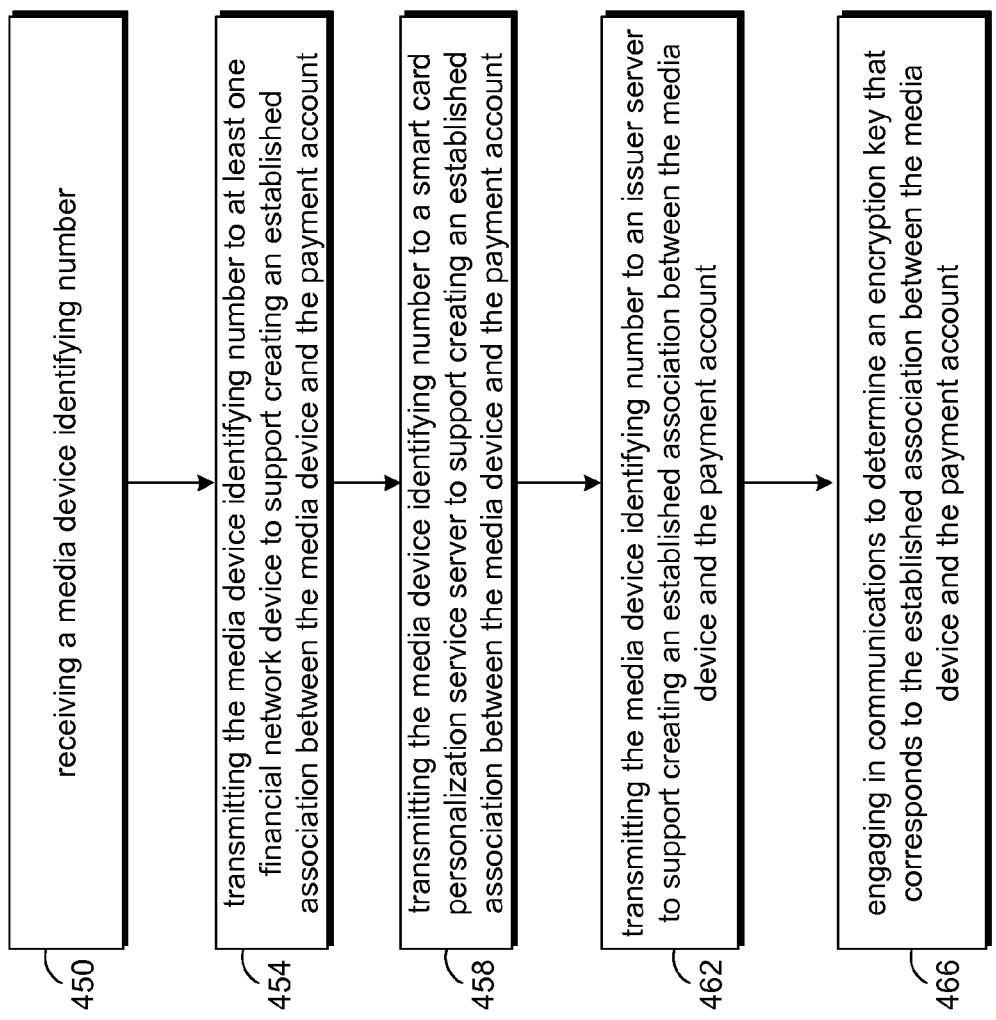

FIG. 14 is a flow chart that illustrates a method for a payment account according to an alternate embodiment of the invention. The method initially includes receiving a media device identifying number (step 450). The media device number may be received by way of an Internet connection with a remote user terminal through a communication module of the server, an input/output module of the server receiving user entries, and a communication link with the media device.

Thereafter, the method includes transmitting the media device identifying number to at least one financial network device to support creating an established association between the media device and the payment account (step 454). The method further transmitting the media device identifying number to a smart card personalization service server to support creating an established association between the media device and the payment account (step 458). The method also optionally includes transmitting the media device identifying number to an issuer server to support creating an established association between the media device and the payment account (step 462). Finally, one embodiment includes engaging in communications to determine an encryption key that corresponds to the established association between the media device and the payment account (step 466). More specifically, the encryption is for encryption a portion of data that is to be transmitted by an authorized media device having the established association with the payment account.

In one specific embodiment of the invention, the three secure methods for "personalizing" the remote control, an I/O device and a media device (for example, an IPTV set top box) with user payment account related data are provided. Generally, the three secure methods for personalizing the media device include pre-issuance personalization, personalization during installation, and post-issuance personalization. Pre-issuance personalization includes personalizing the media device with user payment account information or data prior to either the payment card (e.g., a smart card) or the media device being shipped or delivered to the customer. Personalization during installation is a process wherein the device is personalized during the installation phase of the media device. Finally, post-issuance personalization is a process wherein a new card number is entered post installation or a card number is changed, added, or deleted post installation.

All three methods may require a payment card or account activation process prior to use of the payment functionality on the device. Activation will take place via traditional financial institution methods such as activation by phone, IVR or online activation. In all three personalization scenarios, the media device is assumed to contain a secure module, such as a smart card, tamper resistant module or secure access module (SAM). The device is also assumed to have the necessary slots or ports to insert a smart card or SAM. The secure module may hold an asymmetric key pair with a public key certificate and one or more diversified symmetric keys. In all personalization scenarios actual personalization data may be replaced with a message digest generated by a secure hash algorithm. The actual data can be reconstituted and verification of the message digest may be substituted in lieu of transmission or storage or the actual data.

Figure 15:
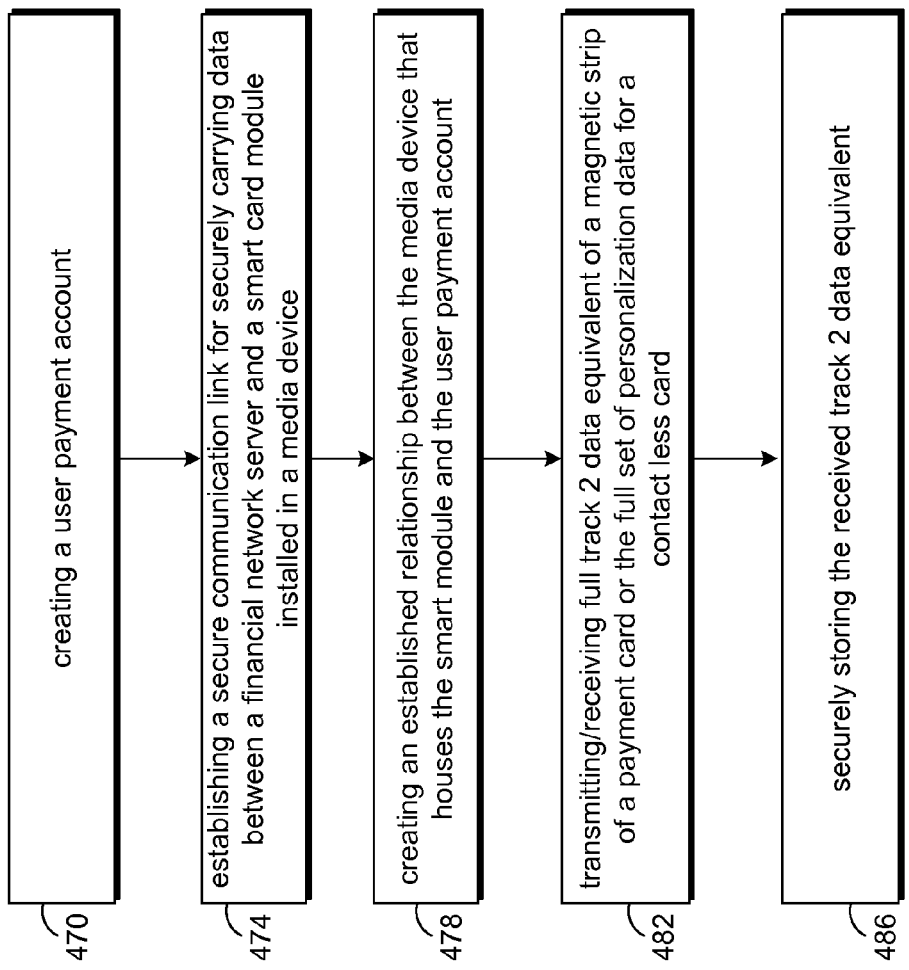

FIG. 15 is a flow chart that illustrates a method for personalizing a smart card for a media device according to one embodiment of the invention. In the two personalization scenarios described above wherein personalization occurs during installation or post delivery of either the media device or the smart card, a method is required for completing the setup for a media device that is to have an established association with a user payment account. The method includes creating a user payment account (step 470). The user payment account is one that is to be used for purchases made through the media device.

The method includes subsequently establishing a secure communication link for securely carrying data between a financial network server and a smart card module installed within the media device (step 474). The financial network server may be a server such as a financial institution server or a payment card processor server. The server and the media device (or smart card) communicate to support the step of creating an established relationship between the media device and the user payment account (step 478).

From the perspective of the smart card or media device, this step includes transmitting a media device ID in relation to the user payment account information to support creating the established relationship between the media device and the user payment account. From the perspective of the network server, this step includes receiving the media device ID in relation to the user payment account information and storing and transmitting such information to other servers in the financial network to facilitate processing in which the media device ID for a purchase selection message may be compared to the user payment account information as a part of approving and settling a purchase transaction.

The method further includes the financial institution server transmitting and the smart card and media device receiving full track 2 data equivalent of a magnetic strip of a payment card or a full set of personalization data for a contactless card (step 482) and the smart card securely storing the received track 2 data equivalent (step 486). Accordingly, when the user makes a purchase selection, a purchase selection message may include the user payment account information (including the track 2 data equivalent). With the above method, a system may be updated to reflect a new account or piece of hardware.

Figure 16:
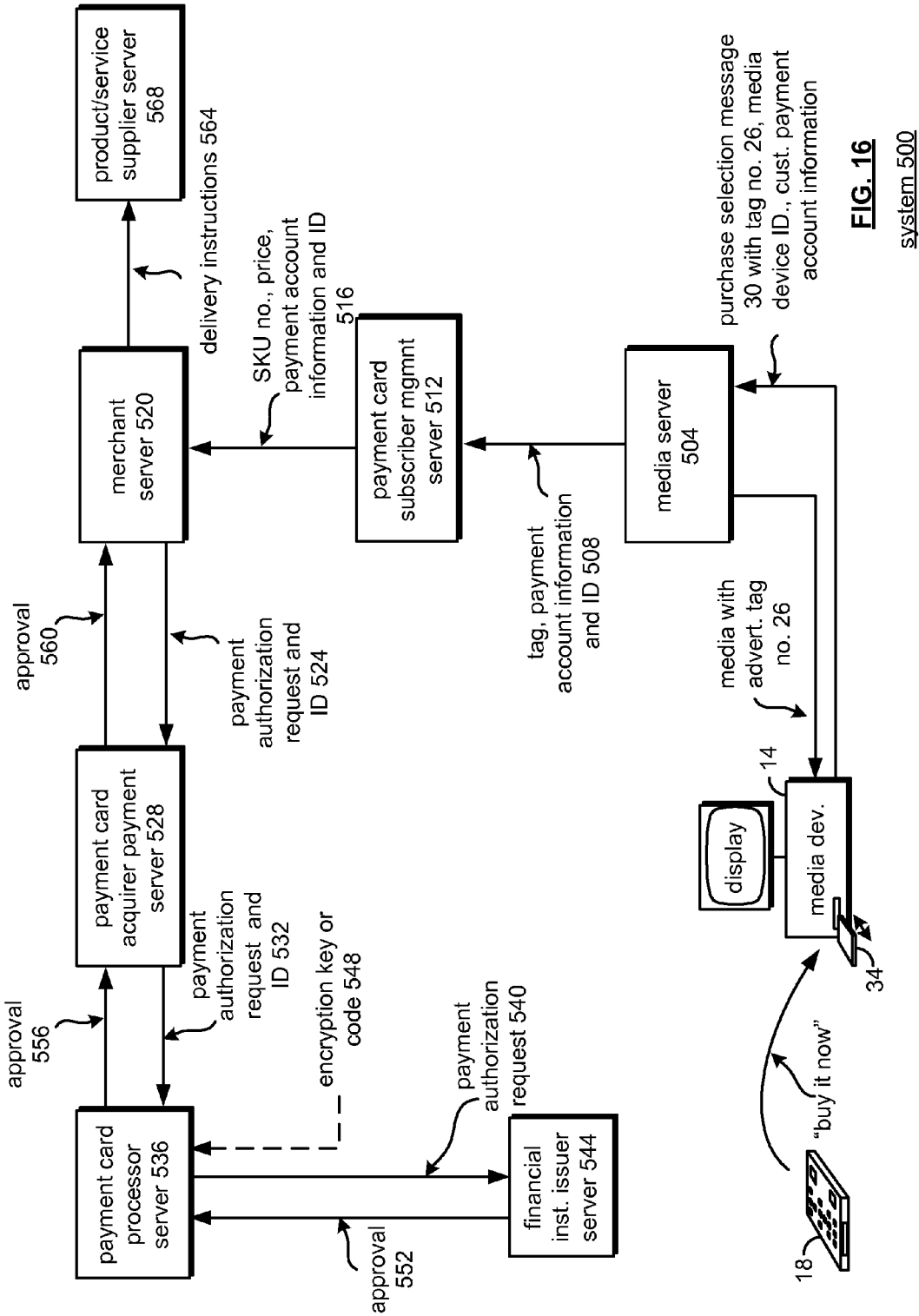
FIG. 16 is a functional block diagram of a computer system that determines whether to approve purchase authorization requests based in part upon an established association between a user payment account and an authorized media device according to one embodiment of the invention.

FIG. 16 is a functional block diagram of a computer system 500 that determines whether to approve purchase authorization requests for purchase selections made through a media device according to one embodiment of the invention based in part upon an established association between a user payment account and an authorized media device. Generally, in the embodiment of FIG. 16, system 500 is operable to conduct a media device ID of a media device that initiates a purchase selection message through various network elements or devices to a payment card processor server. This ID is transmitted in addition to messages transmitted to support a purchase that corresponds to a purchase selection message generated by a specified media device. The payment card processor server is operable to perform at least a partial approval of a purchase authorization request based in part upon the received media device ID.

More specifically, a media server 504 produces media content including an advertisement or other tagged media content with tag number 26 to media device 14. Media device 14 displays the media content on an associated display including the advertisement. In response to receiving a purchase selection from an associated remote control 18, for example, depression of a "buy it now" button on the remote control, media device 14 generates message 30 that includes tag number 26 identifying the tagged media content, a media device ID and customer payment account information to media server 504. The customer payment account information is extracted from smart card 34 which is installed or loaded within media device 14. In one embodiment, at least a portion of the payment account information is encrypted.

Media server 504, in the described embodiment of the invention, then produces message 508 including tag number 26, the payment card account information and the media device ID of media device 14 to payment card subscriber management server 512. Upon receiving message 508, server 512 is operable to translate the tag number into a SKU number with a corresponding price, to verify customer details in the payment account information, and the standing of the customer to whom the payment account belongs. Server 512 is further operable to identify and generate message 516 which includes the SKU number and the price for the item the user is wishing to purchase as indicated in the purchase selection message 30. Message 516 also includes, in one embodiment, the media device ID. Part of generating message 516 includes determining which merchant server 520 is to receive message 516. In one embodiment, the SKU number includes an indication of the merchant server 520.

Upon receiving message 516, merchant server 520 is operable to generate message 524 which includes a payment authorization request and the media device ID to a payment card acquirer payment server 528. The payment authorization request of message 524 further includes the payment card account information. Server 528 is then operable to determine a corresponding payment card processor server 536 and to send message 532 to corresponding payment card processor server 536. Message 532 includes the payment authorization request and the media device ID of the media device 14 that generated purchase selection message 30.

Upon receiving message 532, payment card processor server 536 is operable approve or validate the payment authorization request and to determine a payment card issuer company that issued the payment card account. Server 536 is further operable to place an authorization hold on an amount that is based upon an amount specified in the payment authorization request message. Typically, an authorization hold is placed on a specified amount based an indicated transaction amount to prevent charges from exceeding specified limits such as daily limits, credit limits, etc. Such an authorization hold is typically placed when the authorization request is approved if the account status and specified transaction and credit limits allow approval of the transaction in view of account balances and other authorization holds that have not yet been settled.

Authorization server 536 is operable to also supplement traditional authorization processes by determining whether the received media device ID is an ID of a media device 14 that is authorized to generate purchase selection 30 for the payment card account to validate the transaction. An authorized media device is one that has an established association with the payment account. After approving or validating the payment authorization request, payment card processor 536 transmits the payment authorization request in a payment authorization request message 540 to financial institution issuer server 544. Financial institution issuer server is a server of the previously identified payment card issuer company.

More specifically, server 536 compares the received media device ID to a media device ID that is embedded within the payment card account information (which was originally stored on smart card 34 when smart card 34 was created). Thus, server 536 is operable to extract the media device ID stored within the payment card account information. If the media device ID stored within the payment card account information corresponds to the received media device ID of the media device 14 that generated purchase selection message 30, authorization server 536 sends payment authorization request message 540 to financial institution issuer server 544 indicating that it has approved the payment authorization request for approval. In one embodiment, mere transmission of the payment authorization requests indicates the approval by the authorization server 536. Alternately, an express approval or denial by server 536 may be included in message 540 to enable server 544 to validate or override the determination by server 536.

After receiving message 540, financial institution issuer server 544 is operable to generate message 552 to server 536 that indicates approval (or denial) of the purchase authorization request. Server 536 then generates message 556 to server 528 which then sends message 560 to merchant server 520. Messages 556 and 560 both include the approval indication generated by server 544. Merchant server 520, upon receiving message 560, initiates delivery (assuming an approval indication) of the product or service to an address associated with the payment card account holder. In the illustrated example, merchant server 520 produces delivery instructions 564 to product service supplier server 568.

In one embodiment, the media device ID and at least a portion of the payment account information transmitted within the payment authorization request is encrypted or coded in a manner requiring a corresponding code or encryption key to extract the information. Accordingly, payment card processor server 536 is operable to decode or decrypt the media device ID embedded within the payment account information with a previously received (or determined) encryption key or code for decrypting or decoding the embedded ID. In the example shown, a message 548 is received which includes the encryption key or code. The encryption key or code may be received from an alternate source including, for example, media device 14 or media server 504. In one specific embodiment, the encryption key is based upon the media device ID.

In the embodiments that reference the media device ID being embedded within the payment account information, it should be understood that there are many embodiments for embedding such an ID. For example, the authorized media device ID may be embedded directly within the encrypted payment account information. Alternatively, the media device ID may be used to identify an encryption key that is used to encrypt or protect the encryption information for an authorized media device for the user payment account. Accordingly, based upon a received media device ID, an authorization server 536 selects a corresponding encryption key which will only work to provide access to the encrypted payment account information if the media device that generated the purchase selection message 30 is an authorized media device (for the user payment account in the payment authorization request). Because an encryption key is associated with an ID of a media device, the payment card company server can determine that the media device that generated message 30 is an authorized media device based on the payment data being successfully decrypted and can therefore approve or validate the payment authorization request upon successfully decrypting the payment authorization request.

In one specific embodiment, smart card 34, for example, initiates an encrypted communication with payment card processor server 536 to change an initial key for smart card 34 to a new key to perform a "key rotation." In one embodiment, the new key is associated with the media device ID to associate the smart card (and therefore, user payment account) to the media device and to define the media device as the authorized media device. In this embodiment the new key is derived from a host based master key using the media device ID as derivation data. Thus, the payment card processor server 536 and the media device 14 are able to generate a unique encryption key that is associated with the user payment account (and smart card and media device).

In the embodiment of FIG. 16, a payment card processor server 536 and financial institution server 544 work in cooperative manner to approve a payment authorization request. In an alternate embodiment, a server or server system that belongs to either the payment card processing company or the financial institution issuer may solely perform payment card processing and approval steps and logic described in relation to both servers 536 and 544.

Figure 17:
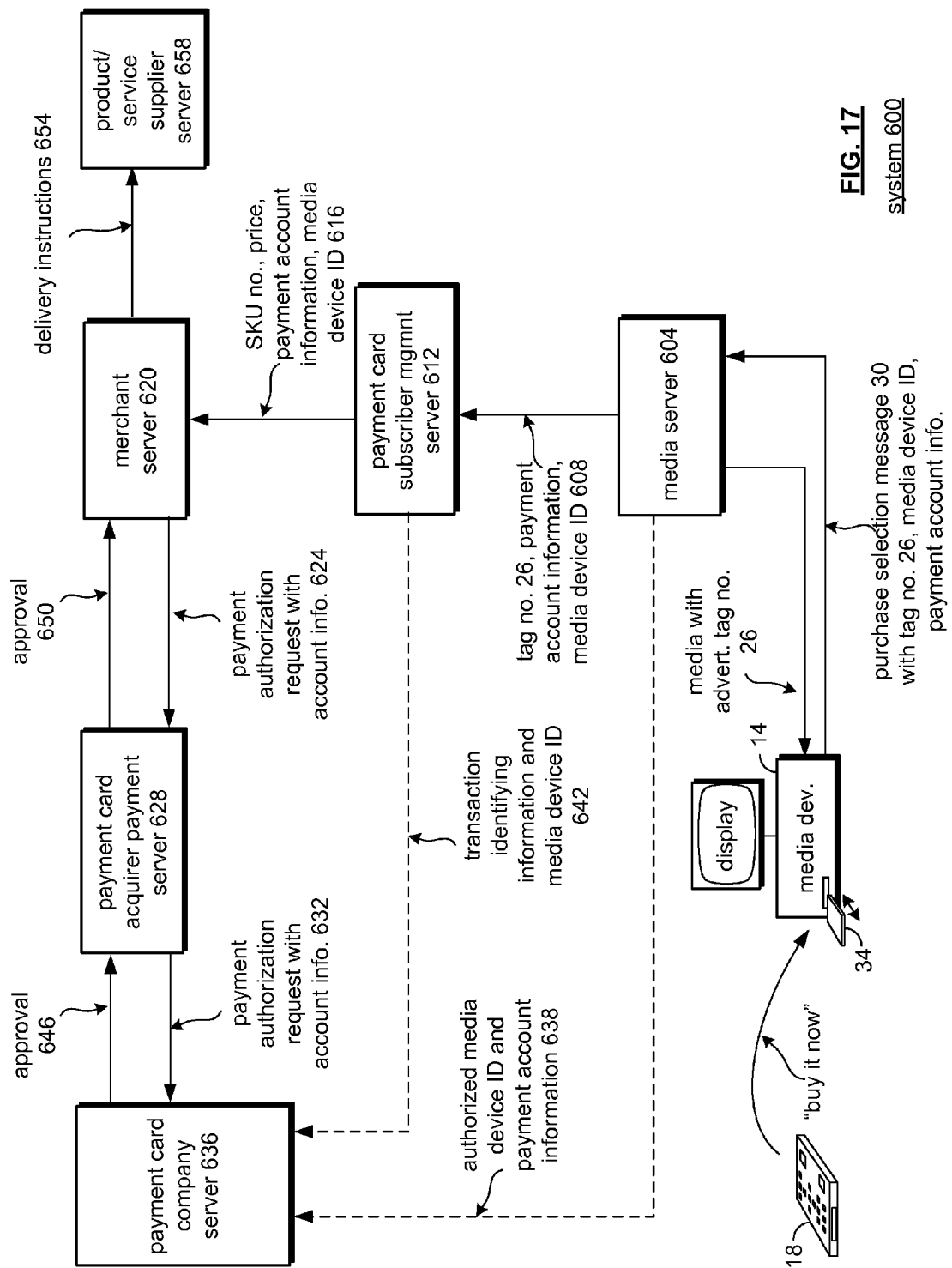
FIG. 17 is a functional block diagram of a computer system 600 that determines whether to approve purchase authorizations for purchase selections made through a media device according to one embodiment of the invention.

FIG. 17 is a functional block diagram of a computer system 600 that determines whether to approve purchase authorizations for purchase selections made through a media device according to one embodiment of the invention. More specifically, a media server 604 produces tagged media content with tag number 26 that identifies the tagged media content to media device 14. In response to receiving a purchase selection from an associated remote control 18, for example, depression of a "buy it now" button on the remote control, media device 14 generates purchase selection message 30 that includes tag number 26 for identifying the tagged media content, a media device ID, and customer payment account information to media server 604. The customer payment account information is extracted from smart card 34 which is installed or loaded within media device 14.

Media server 604, in the described embodiment of the invention, then produces message 608 including the tag number, payment card account information, and media device ID to payment card subscriber management server 612. Upon receiving message 608, server 612 is operable to translate the tag number into a SKU number with a corresponding price, to verify customer details in the payment card account information, and the standing of the customer to whom the payment card account belongs. Server 612 is further operable to identify and generate message 616 which includes the SKU number and the price for the item the user is wishing to purchase when the purchase selection message 30 was generated (the product corresponding to the tag number). Part of generating message 616 includes determining which merchant server 620 is to receive message 616. In one embodiment, the SKU number includes an indication of the merchant server 620.

Upon receiving message 616, merchant server 620 is operable to generate message 624 which includes the payment authorization request to a payment card acquirer payment server 628. The authorization request of message 624 further includes the payment account information. Server 628 is then operable to determine a corresponding payment card company server based on the payment account information and to send message 632 to the corresponding payment card company server 636. Message 632 includes the payment authorization request.

In one embodiment, media server 604 generates message 638 which includes the media device ID and at least a portion of the payment account information for delivery to payment card company server 636. As described in relation to the preceding figure for message 548, message 638 may include an encryption key or other information to enable payment card company server 636 to determine an encryption key for decrypting or gaining access to payment account information received in a payment authorization request.

Accordingly, server 636 is operable to decode or decrypt the payment account information of message 632 with the determined encryption key or code. The encryption key or code may also be received from an alternate source including an encrypted communication directly from media device 14 or even from smart card 34 installed in media device 14. The encryption key may be based upon the media device ID.

In one specific embodiment, smart card 34, for example, initiates an encrypted communication with payment card company authorization server 636 to change an initial master key for smart card 34 to a master key that is based at least in part on the media device ID of the media device within which the smart card payment card is installed. Accordingly, server 636 will only be able to decrypt the encrypted account information if the media device 14 that generates a purchase transaction selection is the one that is authorized for the payment card account. Generally, any encryption key may be generated that can only be used to provide access to account data within purchase selection message 30 generated by media device 14. Because, however, an encryption key is associated with an ID of a media device, the media device ID is implicitly encoded since the payment card company server can determine that the media device that generated message 30 is an authorized media device based on the payment data being successfully decrypted.

As may also be seen, payment card subscriber management server 612 is operable to generate a message 642 to server 636 including transaction identifying information to enable server 636 to determine whether a transaction authorization request that server 636 received was generated by an associated (authorized) media device. In one embodiment, message 642 includes a transaction ID and the ID of the media device that purchase selection message 30 (here, media device 14). Server 636 is operable, therefore, to use the transaction ID to identify the specified transaction and to know what media device generated the purchase selection message 30. In another embodiment, the transaction identifying information includes the SKU number and some account information. Accordingly, the payment card company server 636 compares defined SKU numbers within received payment authorization requests to correlate a payment authorization request to the media device that generated purchase selection message 30. Generally, producing transaction identification information in relation to the media device ID directly to the payment card company server 636 is an alternate approach to requiring servers 620 and 628 to process and transmit the media device ID as was required for servers 520 and 528 of FIG. 16.

Generally, in the embodiment of FIG. 16, a media server 504 of computer system 500 is operable to transmit the media device ID through a plurality of network devices including the merchant server 520 and the acquirer server 528 to payment card processor server 536 for a specified transaction for comparison to an authorized media device ID. Here in FIG. 17, however, media server 604 produces the media device ID to a subscriber management server 612 that, in turn, produces the media device ID directly to the payment card company server 636 for the specified transaction. In either embodiment, the media device ID is presented to the payment card company server 636 (or payment card processor server 536 as shown in FIG. 16) for the specified transaction in a manner that allows the payment card company server 636 (or processor server 536) to correlate the received media device ID to a specified transaction purchase authorization request. The payment card company server 636 of FIG. 17 may comprise a server that is within a private financial network of a payment card authorization company such as, for example, Visa, Inc., or one that is owned by a financial institution card issuer such as a bank, or a combination of both, as described in relation to FIG. 16.

Upon receiving message 632, payment card company server 636 is operable to determine whether to approve or deny the authorization request received in message 632 using traditional approval logic for payment card processing servers and issuer company servers as known by one of average skill in the art. Additionally, server 636 is further operable to determine to approve or deny the transaction also by determining whether the media device that generated a purchase selection message was authorized to do so by determining the media device ID in the transaction identification information corresponds to the authorized media device ID.

The transaction identification information described above includes any information that allows server 636 to identify a corresponding payment authorization request that is received subsequently to the transaction identification information. Thus, for example, message 642 could include a merchant number in place of or in addition to the SKU number. Accordingly, if the merchant number or SKU number is received with the payment authorization request 632, then server 636 knows what media device ID to compare to an authorized as a part of approving the transaction. A message similar to message 642 may be generated by another server as well. For example, media server 604 may generate message 642 to server 636.

Once the payment authorization request is approved, payment card company server 636 sends message 646 to server 628 which then sends message 650 to merchant server 620. Messages 646 and 650 both include the approval indication. Merchant server 620, upon receiving message 650, initiates delivery of the product or service to an address associated with the payment card account holder. In the illustrated example, merchant server 620 produces delivery instructions 654 to product service supplier server 658. Message 646 containing the approval indication is generated for delivery to merchant server 620 by way of one or more servers though message 646 may also be transmitted directly to merchant server 620.

Figure 18A:
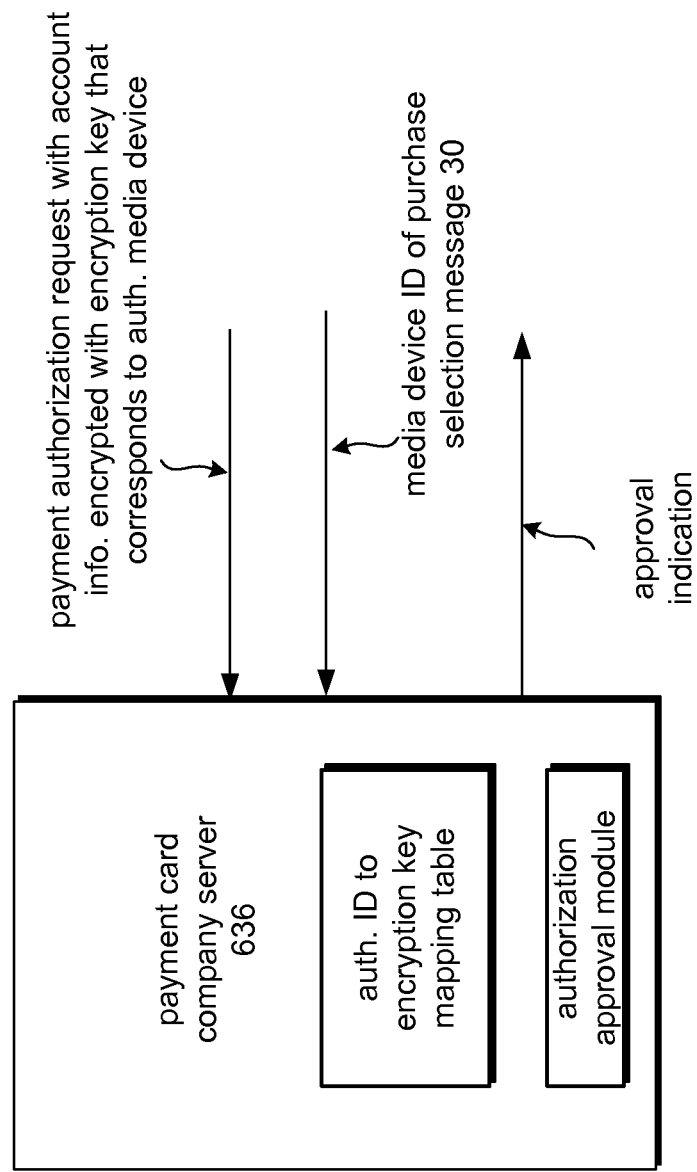
FIGS. 18A-18C are functional block diagrams of alternate embodiments of the invention of a payment card company server.
Figure 18B:
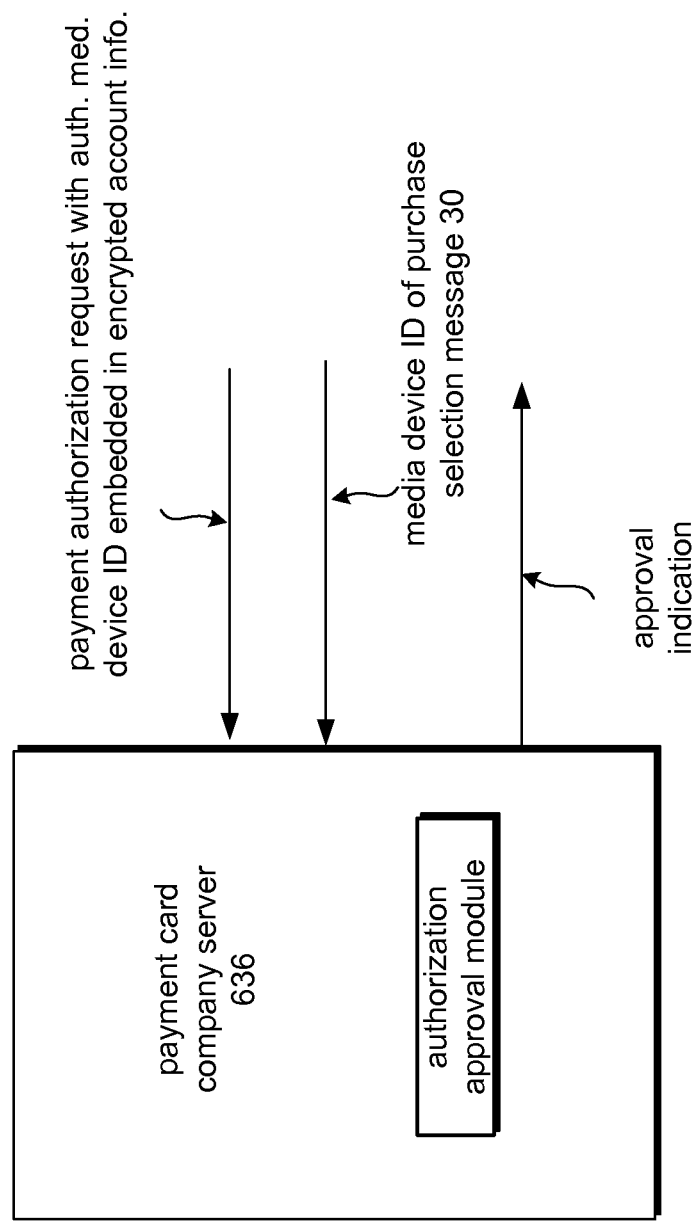
Figure 18C:
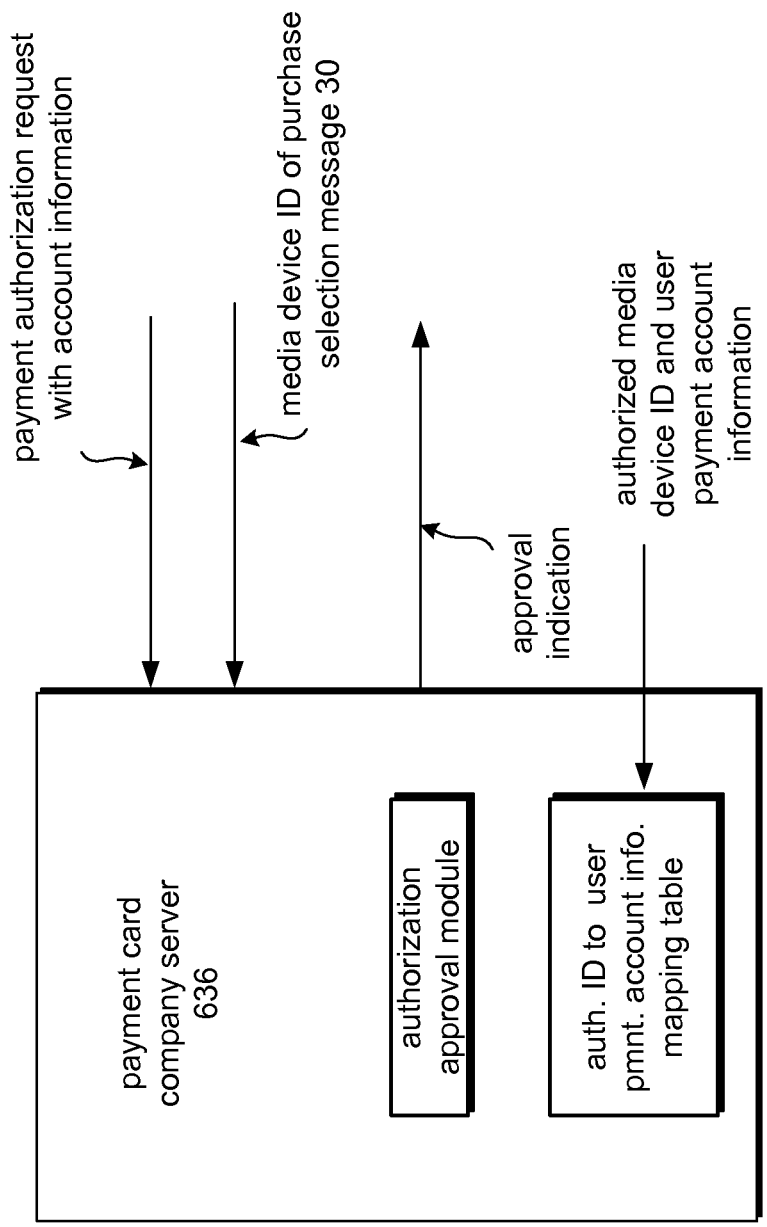

FIGS. 18A-18C are functional block diagrams of alternate embodiments of the invention of a payment card company server 636. In each of FIGS. 18A-18C, the payment card company server 636 is a part of a payment card company payment processing network and includes logic to determine whether to approve or validate a payment authorization request. The logic and structure shown in each of FIGS. 18A-18C may be used for any server that is operable to approve or validate a payment authorization request. Each embodiment of server 636 includes an authorization approval module or defined logic that is operable to make a decision to approve or deny the received payment authorization request and to generate an approval indication either in a specified message or merely by further transmitting the payment authorization request to another server.

In reference to FIG. 18A, payment card company server 636 is operable to receive payment account information within a received payment authorization request that is encrypted with an encryption key that corresponds with the authorized media device that has an established association with the user payment account. Server 636 includes logic for storing authorized media device IDs in relation to associated encryption keys in a mapping table. Server 636 includes an authorization approval module which further includes logic for determining whether to validate or approve a purchase authorization request. The authorization approval module defines logic for approving the purchase authorization requests based upon user account standing, credit limits, balances, pending transactions, etc. Additionally, the authorization approval module is operable to approve a purchase authorization request based upon whether an authorized media device generated a purchase selection message that corresponds to the purchase authorization request.

Based upon a received ID of the media device that generated the purchase selection message 30, server 636 is operable to select a corresponding encryption key from the mapping table to access the payment account information. If the selected encryption key allows decryption of the account information, then the media device that generated purchase selection message 30 is one that has an established association with the user payment account and is authorized. Otherwise, the selected encryption key is not the one required to access the user payment account information. If the encryption key allows server 636 to access the payment account information, server system 636 generates an approval indication as shown (assuming the authorized request would be approved using known approval determination steps).

In reference to FIG. 18B, payment card company server 636 is operable and coupled to receive a payment authorization request with an authorized media device ID embedded in the encrypted account information. Server 636 includes an authorization approval module, which further includes logic for determining whether to validate or approve a purchase authorization request. The authorization approval module defines logic for approving the purchase authorization requests based upon user account standing, credit limits, balances, pending transactions, etc. Additionally, the authorization approval module is operable to approve a purchase authorization request based upon whether an authorized media device generated a purchase selection message that corresponds to the purchase authorization request.

Payment card company server 636 is operable to receive an ID of a media device 14 that generated purchase selection message 30. The ID of the media device 14 that generated purchase selection message 30 may be received as a part of the same message as the payment authorization request or as a separate message. Server system 636 is operable to extract the ID embedded in the encrypted account information of the authorized media device to evaluate whether the received ID for the media device that generated the purchase selection message is authorized (i.e., has an established association with the user payment account). If the two IDs are a match, server system 636 generates an approval indication as shown (assuming the authorized request would be approved using known approval determination steps).

In reference to FIG. 18C which is a functional block diagram of a payment card company server 636 according to an alternate embodiment of the invention, payment card company server system 636 includes an authorization approval module and logic for generating an authorized ID to user payment account mapping table. Server 636 includes an authorization approval module which further includes logic for determining whether to validate or approve a purchase authorization request. The authorization approval module defines logic for approving the purchase authorization requests based upon user account standing, credit limits, balances, pending transactions, etc. Additionally, the authorization approval module is operable to approve a purchase authorization request based upon whether an authorized media device generated a purchase selection message that corresponds to the purchase authorization request.

As may be seen, payment card company server 636 is operable and coupled to receive a payment authorization request and to receive an ID of a media device 14 that generated purchase selection message 30. The ID of the media device that may be received as a part of the same message as the payment authorization request or as a separate message as shown here in FIG. 18B.

The authorized ID-user payment account mapping table is pre-loaded with information that defines the established associations between payment accounts and media devices. More specifically, the mapping table is pre-loaded with authorized media device IDs that are mapped to payment account information. Thus, based on the received account information within a payment authorization request, server 636 is operable to determine an authorized media device ID for comparing to the received media device ID to determine if the received media device ID was for an authorized media device for the payment account. If the two IDs are a match, server 636 generates an approval indication as shown. In this embodiment, the account information within the payment authorization request is encrypted, though the encryption key is not necessarily based upon the media device ID.

Figure 19:
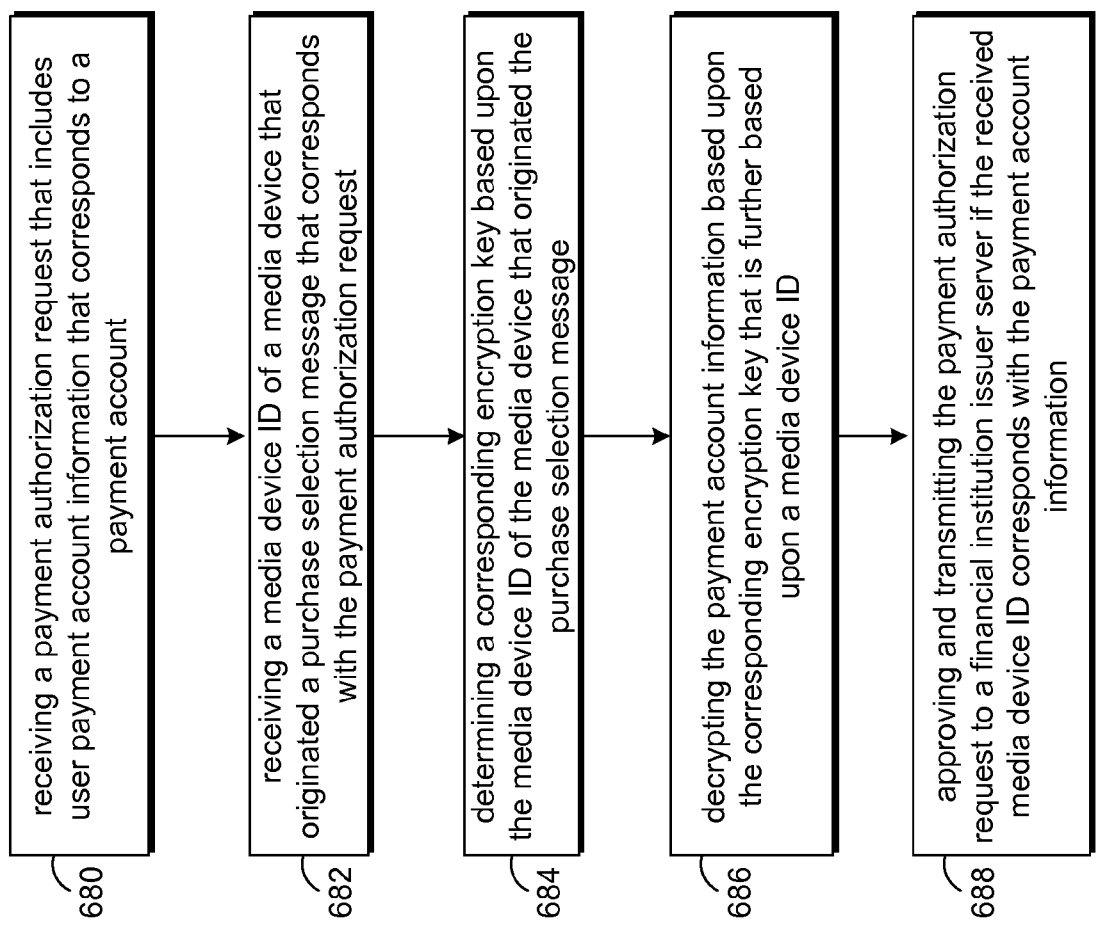

FIG. 19 is a flow chart that illustrates various method steps according to an embodiment of the invention for approving a purchase authorization request in which a media device module ID is used to encrypt payment account information. Referring to FIG. 19, a first step includes receiving a payment authorization request that includes corresponding user payment card account information (step 680). In one embodiment of the invention, an additional method step includes receiving a media device ID of a media device that originated a purchase selection message that corresponds with the payment authorization request (step 682). The media device ID may be received either with the payment authorization request or in advance in a manner that allows the payment authorization request to be identified when received (e.g., with transaction identification information). Thereafter, the method includes determining a corresponding encryption key based upon the received ID of the media device that generated the purchase selection message (step 684).

Once the corresponding encryption key has been determined, the method includes decrypting the payment account information based upon the corresponding encryption key (step 686). In the described embodiment, the corresponding encryption key is selected based upon an ID of a media device. Accordingly, if the received ID is not the ID of a media device that is authorized to generate the purchase selection for the payment account, the selected encryption key will not be the one that is required to decrypt the payment account information in the payment authorization request. If the payment account is successfully decrypted, however, the method includes approving or validating the payment authorization request and transmitting the payment authorization request to a payment card issuer server (step 688). This step implicitly includes determining a corresponding issuing server for the payment account.

FIG. 20 is a flow chart that illustrates a method for a payment card processing company server according to an embodiment of the invention. The first step includes receiving a payment authorization request that includes user payment card account information that corresponds to a user payment account (step 690). The method also includes receiving a media device ID for a purchase selection with identification information that corresponds to a payment authorization request (step 692). The method includes receiving a media device ID of an authorized media device in relation to a payment account (step 694). The method also includes determining whether the received media device ID corresponds to an authorized media device (one that has an established association with the user payment account) and validating the payment authorization request (step 696). Validating the payment authorization request can include any one of forwarding the payment authorization request to an issuer server, sending an approval indication to any one of a plurality of servers including the issuer server or to, ultimately, the merchant server. It should be understood that validating the payment authorization request further includes traditional authorization processing and logic including, for example, evaluating account status and account credit limits in relation to the payment authorization request and other similar determinations or evaluations. This step may also include placing a hold on funds based upon an amount specified in a purchase authorization request.

In one embodiment, the step includes determining whether the received media device ID is the same as an ID embedded either implicitly or explicitly in the payment account information. In another embodiment, the step includes determining whether the received media device ID is the same as an ID stored in a table that maps media device IDs to payment account information. Finally, the method includes identifying an issuer server (for the second embodiment described here in this paragraph) and, if the IDs match, sending the payment authorization request to the issuer server (step 698).

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a message but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, messages, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

What is claimed is:

1. A method comprising:
    receiving, by a server, a payment authorization request associated with a purchase selection message originating from a media device, wherein the payment authorization request includes encrypted user payment account information;
    receiving, by the server, an ID of the media device that generated the purchase selection message associated with the payment authorization request;
    determining, by the server, whether the media device is authorized to conduct transactions using the encrypted user payment account information, wherein determining whether the media device is authorized to conduct transactions includes:
        determining a decryption key based on the received ID of the media device;
        decrypting the encrypted user payment account information using the determined decryption key;
        extracting an ID from the decrypted user payment account information; and
        determining that the extracted ID corresponds to the ID of the media device; and
    sending an approval message to a payment server based on the determination that the extracted ID corresponds to the ID of the media device.

2. The method of claim 1 wherein the encrypted user payment account information includes a user payment account identifier and the ID of the media device for an authorized media device associated with the user payment account identifier, wherein the encrypted user payment account information is generated using an encryption key based on the ID of the media device, the user payment account identifier being associated with a user payment account.

3. The method of claim 1 wherein determining the decryption key comprises consulting a mapping table using the received ID of the media device to select an encryption key corresponding to the received ID of the media device, wherein the mapping table includes association information between one or more authorized device ID's and one or more encryption keys.

4. The method of claim 1 wherein the payment authorization request message is received from a payment card acquirer server, the method further comprising:
    receiving transaction identification information from a payment card subscriber management server; and
    associating the received ID of the media device with the payment authorization request message based on the transaction identification information.

5. The method of claim 1 wherein the encrypted user payment account information is from a smart card coupled to the media device and wherein the smart card was created by a smart card personalization service based on the ID of the media device.

6. The method of claim 1 further comprising:
receiving, by the server, a SKU number that can identify a merchant;
determining a merchant based at least in part on the SKU number; and
in response to determining that the media device that transmitted the purchase selection message is authorized to conduct transactions using a user payment account associated with the encrypted user payment account information, sending an approval to the merchant.

7. The method of claim 1 wherein the media device is an authorized media device that has an established association with a user payment account associated with the encrypted user payment account information, and wherein the media device that transmitted the purchase selection message is authorized to conduct transactions using the user payment account based on the established association.

8. The method of claim 5 wherein the smart card is delivered separately from the media device to a user of the media device.

9. The method of claim 5 wherein the smart card stores the ID of the media device in an encrypted form along with other account information to create an established association between the user payment account and the media device.

10. A system comprising:
one or more processors; and
one or more non-transitory computer-readable storage media containing instructions which when executed by the one or more processors cause the one or more processors to perform a method including:
receiving a payment authorization request associated with a purchase selection message originating from a media device, wherein the payment authorization request includes encrypted user payment account information;
receiving an ID of the media device that generated the purchase selection message associated with the payment authorization request;
determining whether the media device is authorized to conduct transactions using the encrypted user payment account information, wherein determining whether the media device is authorized to conduct transactions includes:
determining a decryption key based on the received ID of the media device;
decrypting the encrypted user payment account information using the determined decryption key;
extracting an ID from the decrypted user payment account information; and
determining that the extracted ID corresponds to the ID of the media device; and
sending an approval message to a payment server based on the determination that the extracted ID corresponds to the ID of the media device.

11. The system of claim 10 wherein determining the decryption key comprises consulting a mapping table using the ID of the media device to select an encryption key corresponding to the ID of the media device, wherein the mapping table includes association information between one or more authorized device ID's and one or more encryption keys.

12. The system of claim 10 wherein the encrypted user payment account information includes a user payment account identifier and the ID of the media device for an authorized media device associated with the user payment account identifier, wherein the encrypted user payment account information is generated using an encryption key based on the ID of the media device, the user payment account identifier being associated with a user payment account.

13. The system of claim 10 wherein the payment authorization request message is received from a payment card acquirer server, the system further comprising instructions configured to cause the one or more processors to perform the method including:
receiving transaction identification information from a payment card subscriber management server; and
associating the received ID of the media device with the payment authorization request message based on the transaction identification information.

14. The system of claim 10 wherein the encrypted user payment account information is from a smart card coupled to the media device and wherein the smart card was created by a smart card personalization service based on the ID of the media device.

15. The system of claim 10 further comprising instructions configured to cause the one or more processors to perform operations including:
receiving, by the server, a SKU number that can identify a merchant;
determining a merchant based at least in part on the SKU number; and
in response to determining that the media device that transmitted the purchase selection message is authorized to conduct transactions using a user payment account associated with the encrypted user payment account information, sending an approval to the merchant.

16. The system of claim 10 wherein the media device is an authorized media device that has an established association with a user payment account associated with the encrypted user payment account information, and wherein the media device that transmitted the purchase selection message is authorized to conduct transactions using the user payment account based on the established association.

17. The system of claim 14 wherein the smart card is delivered separately from the media device to a user of the media device.

18. The system of claim 14 wherein the smart card stores the ID of the media device in an encrypted form along with other account information to create an established association between the user payment account and the media device.

* * * * *